US012135838B2

(12) United States Patent
Yokoyama et al.

(10) Patent No.: US 12,135,838 B2
(45) Date of Patent: *Nov. 5, 2024

(54) INFORMATION PROCESSING DEVICE AND INFORMATION PROCESSING METHOD FOR TACTILE STIMULATION

(71) Applicant: SONY GROUP CORPORATION, Tokyo (JP)

(72) Inventors: Ryo Yokoyama, Tokyo (JP); Osamu Ito, Tokyo (JP); Ikuo Yamano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 18/062,861

(22) Filed: Dec. 7, 2022

(65) Prior Publication Data

US 2023/0102542 A1     Mar. 30, 2023

Related U.S. Application Data

(63) Continuation of application No. 16/968,736, filed as application No. PCT/JP2018/042507 on Nov. 16, 2018, now Pat. No. 11,550,396.

(30) Foreign Application Priority Data

Feb. 16, 2018  (JP) ................. 2018-025709

(51) Int. Cl.
*G06F 3/01*          (2006.01)
(52) U.S. Cl.
CPC .................... *G06F 3/016* (2013.01)

(58) Field of Classification Search
CPC .............................. A63F 13/285; G06F 3/016
See application file for complete search history.

(56) References Cited

U.S. PATENT DOCUMENTS 11,550,396 B2 *  1/2023  Yokoyama .............. G06F 3/016
2010/0245237 A1   9/2010  Nakamura
2015/0187188 A1   7/2015  Raskin
(Continued)

FOREIGN PATENT DOCUMENTS

CN       104922899 A     9/2015
CN       105094312 A     11/2015
(Continued)

OTHER PUBLICATIONS

International Search Report and Written Opinion of PCT Application No. PCT/JP2018/042507, issued on Jan. 22, 2019, 12 pages of English Translation and 10 pages of ISRWO.

(Continued)

*Primary Examiner* — Daniell L Negron
(74) *Attorney, Agent, or Firm* — CHIP LAW GROUP

(57) ABSTRACT

An information processing device includes: a control unit that generates, on the basis of control information relating to tactile stimulation to be perceived by a second user as configured by a first user and on the basis of characteristics of a tactile stimulation unit that outputs the tactile stimulation to the second user, a control signal which is inputted to the tactile stimulation unit and which serves to cause the second user to perceive the tactile stimulation indicated by the control information.

19 Claims, 11 Drawing Sheets

(56) References Cited

U.S. PATENT DOCUMENTS

| | | |
|---|---|---|
| 2015/0268722 A1 | 9/2015 | Wang et al. |
| 2015/0323994 A1 | 11/2015 | Stahlberg et al. |
| 2018/0178121 A1 | 6/2018 | Yamashita et al. |

FOREIGN PATENT DOCUMENTS

| | | |
|---|---|---|
| EP | 2921212 A1 | 9/2015 |
| EP | 2942699 A1 | 11/2015 |
| EP | 3343327 A1 | 7/2018 |
| JP | 2006-136865 A | 6/2006 |
| JP | 2006-288621 A | 10/2006 |
| JP | 2015-187862 A | 10/2015 |
| JP | 2015-215891 A | 12/2015 |
| JP | 2018-102610 A | 7/2018 |
| KR | 10-1174450 B1 | 8/2012 |
| KR | 10-2015-0109269 A | 10/2015 |
| KR | 10-2015-0127536 A | 11/2015 |
| WO | 2009/035100 A1 | 3/2009 |

OTHER PUBLICATIONS

International Preliminary Report on Patentability of PCT Application No. PCT/JP2018/042507, issued on Aug. 27, 2020, 12 pages of English Translation and 07 pages of IPRP.

Notice of Allowance for U.S. Appl. No. 16/968,736, issued on Sep. 8, 2022, 7 pages.

Non-Final Office Action for U.S. Appl. No. 16/968,736, issued on Dec. 22, 2021, 11 pages.

Final Office Action for U.S. Appl. No. 16/968,736, issued on Apr. 26, 2022, 5 pages.

Advisory Action for U.S. Appl. No. 16/968,736, issued on Jul. 14, 2022, 3 pages.

\* cited by examiner

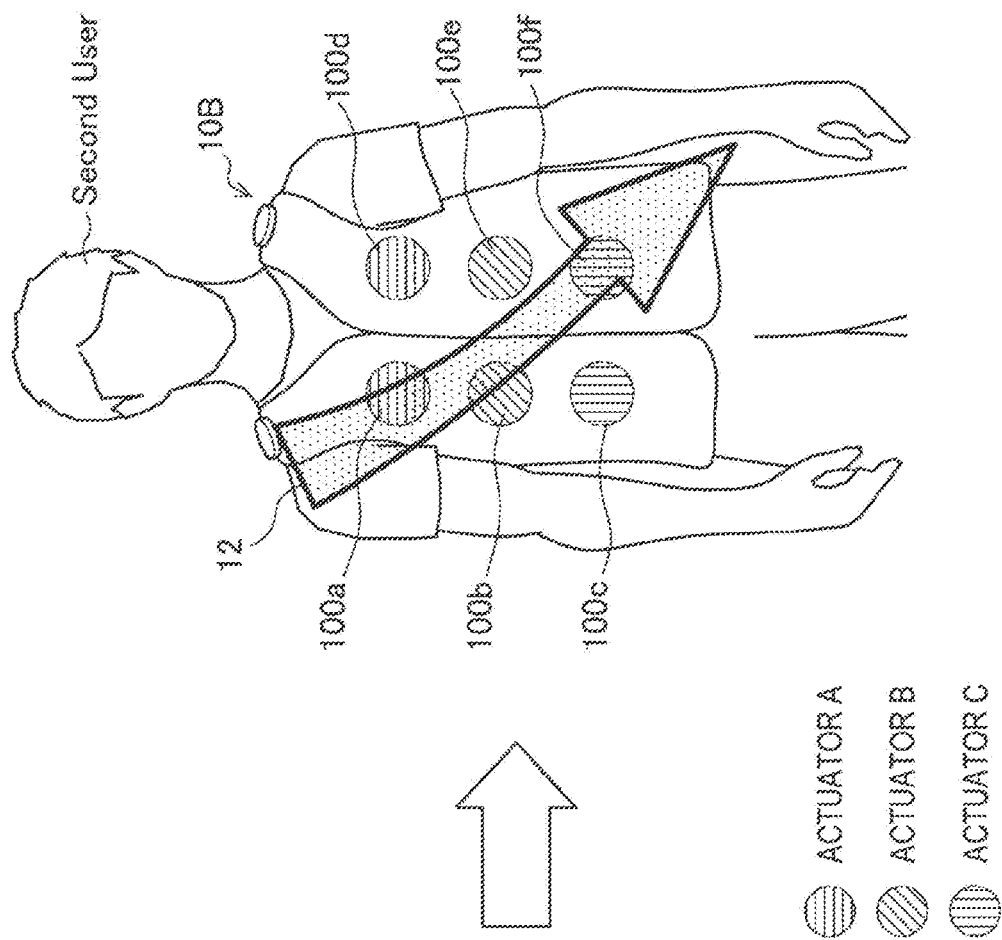
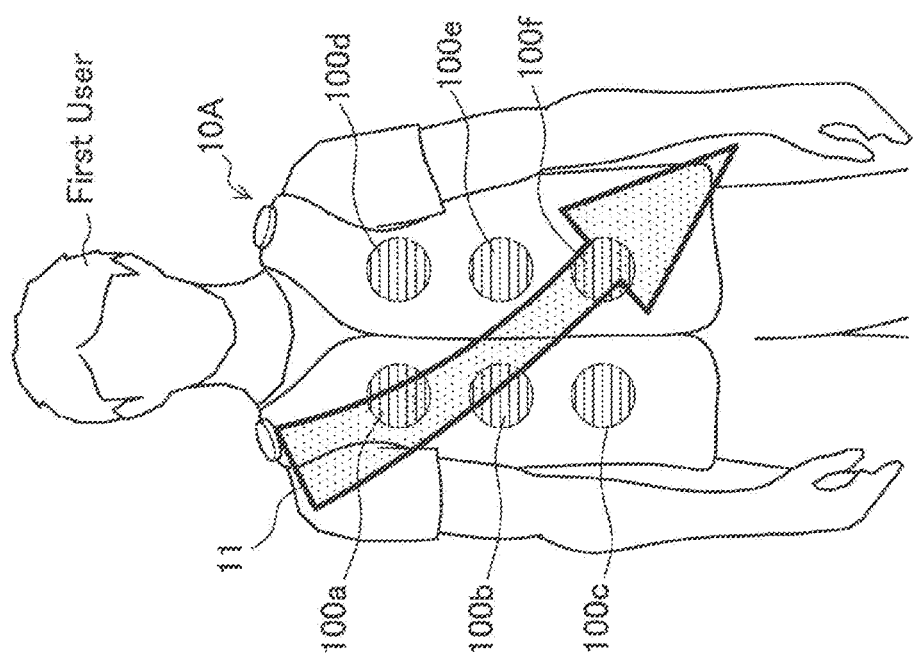
FIG.2

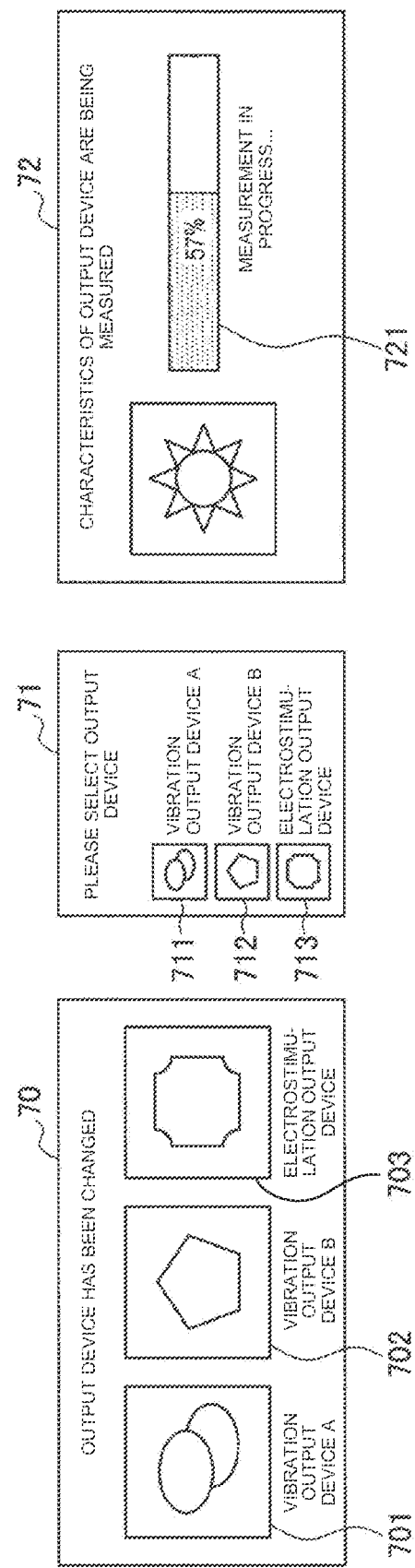

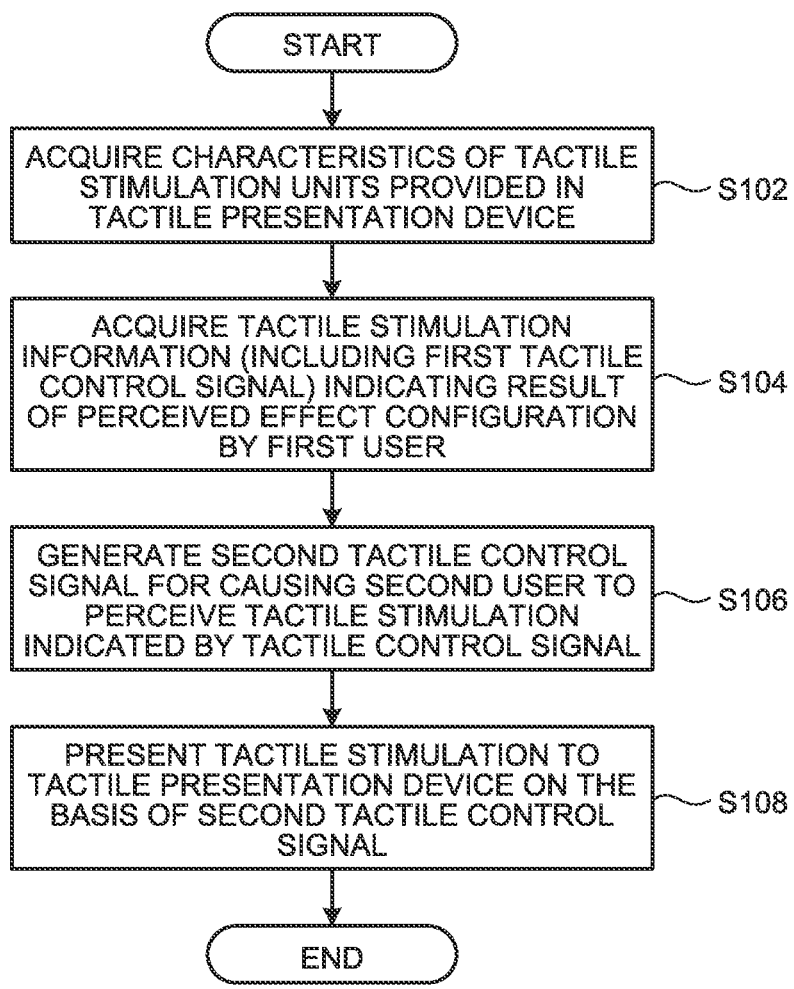

INFORMATION PROCESSING DEVICE AND INFORMATION PROCESSING METHOD FOR TACTILE STIMULATION

CROSS REFERENCE TO RELATED APPLICATIONS

This application is a continuous application of U.S. patent application Ser. No. 16/968,736, filed on Aug. 10, 2020, which is a U.S. National Phase of International Patent Application No. PCT/JP2018/042507 filed on Nov. 16, 2018, which claims priority benefit of Japanese Patent Application No. JP 2018-025709 filed in the Japan Patent Office on Feb. 16, 2018. Each of the above-referenced applications is hereby incorporated herein by reference in its entirety.

FIELD

The present disclosure relates to an information processing device, an information processing method, and a recording medium.

BACKGROUND

Various technologies for presenting tactile stimulation such as vibration to a user have been proposed. Such technology is also called haptic technology and is used to feedback tactile stimulation of an object in a virtual space or a remote location to the user, for example.

Where tactile stimulation is concerned, Patent Literature 1 below discloses a technology that presents vibrations that correspond to desired tactile stimulation to a user by combining a piezoelectric actuator with a vibration motor.

CITATION LIST

Patent Literature

Patent Literature 1: JP 2006-136865 A

SUMMARY

Technical Problem

In recent years, various tactile presentation devices have emerged. A tactile presentation device has one or more tactile stimulation units that output tactile stimulation and presents tactile stimulation to a user by causing the tactile stimulation units to operate on the basis of inputted control information. When control information for causing the user to perceive predetermined tactile stimulation which has been configured on the assumption that a certain tactile presentation device is being used is inputted to another tactile presentation device, there is a risk that tactile stimulation different from that assumed will be perceived by the user. This is because there may be a difference in characteristics such as different tactile stimulation units being provided for each tactile presentation device. Such a phenomenon is desirably suppressed because it may be attributable to a deterioration in the user experience.

Therefore, the present disclosure provides a mechanism enabling absorption of a difference in the characteristics of each tactile presentation device when tactile stimulation is presented to the user.

Solution to Problem

According to the present disclosure, an information processing device is provided that includes: a control unit that generates, on the basis of control information relating to tactile stimulation to be perceived by a second user as configured by a first user and on the basis of characteristics of a tactile stimulation unit that outputs the tactile stimulation to the second user, a control signal which is inputted to the tactile stimulation unit and which serves to cause the second user to perceive the tactile stimulation indicated by the control information.

Moreover, according to the present disclosure, an information processing method executed by a processor is provided that includes: generating, on the basis of control information relating to tactile stimulation to be perceived by a second user as configured by a first user and on the basis of characteristics of a tactile stimulation unit that outputs the tactile stimulation to the second user, a control signal which is inputted to the tactile stimulation unit and which serves to cause the second user to perceive the tactile stimulation indicated by the control information.

Moreover, according to the present disclosure, a recording medium is provided whereon a program is recorded, the program serving to cause a computer to function as a control unit that generates, on the basis of control information relating to tactile stimulation to be perceived by a second user as configured by a first user and on the basis of characteristics of a tactile stimulation unit that outputs the tactile stimulation to the second user, a control signal which is inputted to the tactile stimulation unit and which serves to cause the second user to perceive the tactile stimulation indicated by the control information.

Advantageous Effects of Invention

As described hereinabove, according to the present disclosure, provided is a mechanism enabling absorption of a difference in the characteristics of each tactile presentation device when tactile stimulation is presented to the user. Note that the foregoing advantageous effects are not necessarily restrictive and that any of the advantageous effects disclosed in the present specification or other advantageous effects which may be understood from the present specification may also be exhibited in addition to the foregoing advantageous effects or instead of the foregoing advantageous effects.

BRIEF DESCRIPTION OF DRAWINGS

FIG. 2 is a diagram serving to illustrate an overview of a proposal method.

FIG. 10 is a diagram illustrating an example of a notification screen pertaining to acquisition of the characteristics of tactile stimulation units according to the present embodiment.

FIG. 11 is a flowchart illustrating an example of the flow of tactile stimulation output control processing that is executed by the information processing device according to the present embodiment.

DESCRIPTION OF EMBODIMENTS

Figure 1:
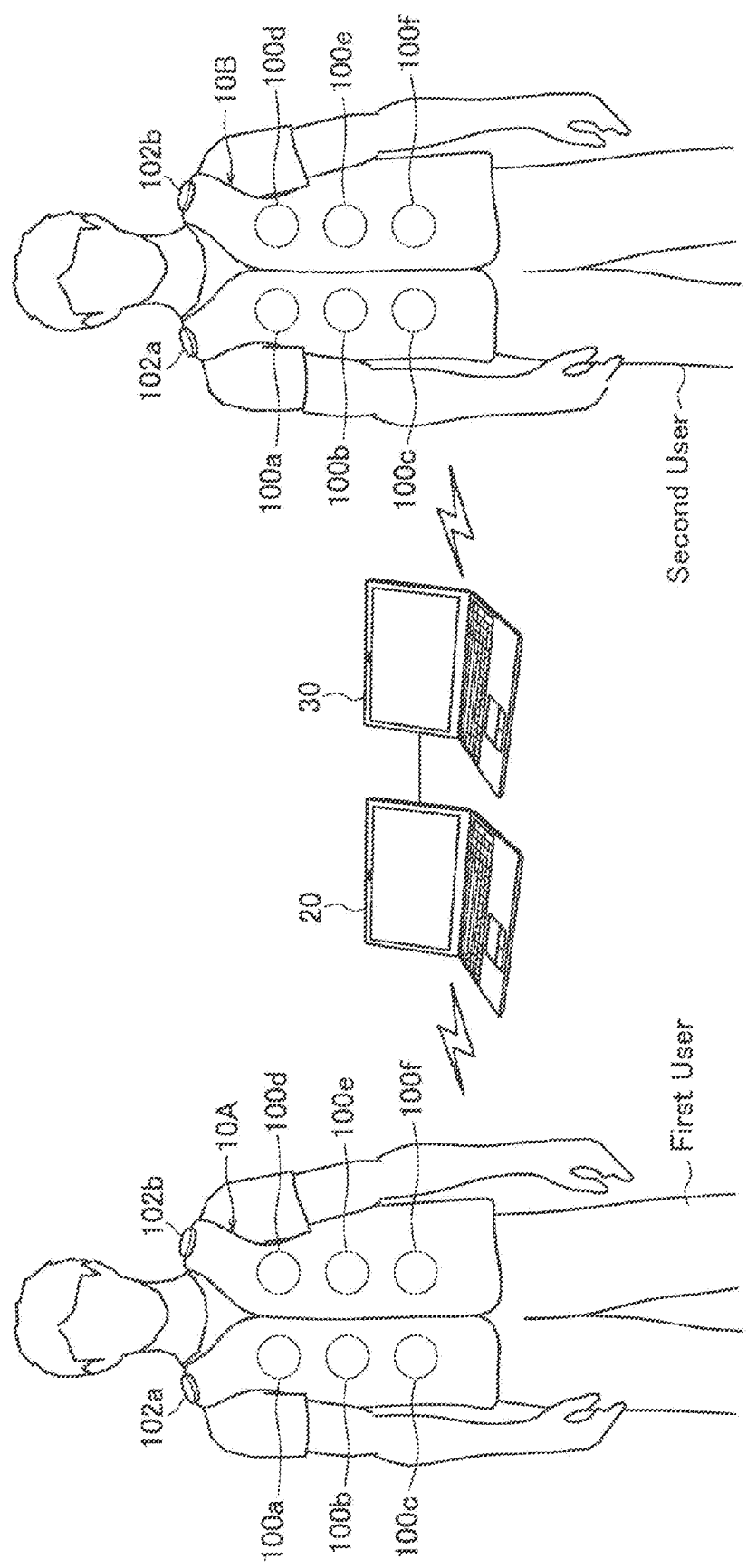
FIG. 1 is a diagram illustrating an overview of an information processing system according to one embodiment of the present disclosure.

Preferred embodiments of the present disclosure will be described in detail hereinbelow with reference to the accompanying drawings. Note that repetitive descriptions are omitted from the present specification and drawings by assigning the same reference signs to constituent elements which have substantially the same function configurations.

In addition, elements which have substantially the same function configurations in the present specification and the drawings are sometimes distinguished by appending different alphabetic characters after the same reference signs. For example, a plurality of elements which have substantially the same function configurations are distinguished as tactile presentation devices 10A and 10B where necessary. However, when there is no particular need to distinguish between each of a plurality of elements which have substantially the same function configurations, only identical reference signs are appended. For example, when there is no particular need to distinguish between the tactile presentation devices 10A and 10B same are simply called the tactile presentation devices 10.

Note that the description will be provided in the following order:
1. Overview of information processing system according to one embodiment of the present disclosure
2. Configuration example
2.1. Configuration example of tactile presentation device 10
2.2. Configuration example of information processing device 20
2.3. Configuration example of information processing device 30
3. Flow of processing
4. Summary

1. Overview of Information Processing System According to One Embodiment of the Present Disclosure FIG. 1 is a diagram illustrating an overview of an information processing system according to one embodiment of the present disclosure. As illustrated in FIG. 1, the information processing system according to the present embodiment includes the tactile presentation devices 10A and 10B and information processing devices 20 and 30.

(1) Tactile Presentation Devices 10

The tactile presentation devices 10 (10A and 10B) are devices that present tactile stimulation to a user. The tactile presentation device 10A presents tactile stimulation to a first user, and the tactile presentation device 10B presents tactile stimulation to a second user. Although there are no particular restrictions on the shape of the tactile presentation devices 10, a vest-type device which is worn by the user as illustrated in FIG. 1 is cited as an example. The tactile presentation devices 10 illustrated in FIG. 1 contain a plurality of tactile stimulation units 100 (also called actuators) and two speech output units 102. For example, a predetermined number (for example, six) tactile stimulation units 100 may be arranged, inside the tactile presentation devices 10, on each of the front and back sides, respectively, of the user. By way of an example, individual tactile stimulation units 100 are arranged in positional relationships such that the individual tactile stimulation units 100 arranged on the front side and the individual tactile stimulation units 100 arranged on the back side face one another.

Note that, although an example in which the tactile presentation devices 10 are of the vest type (sleeveless garment) is illustrated in FIG. 1, these devices are not limited to this example, and the tactile presentation devices 10 may have sleeves. In this case, the tactile stimulation units 100 may be arranged not only on the chest and stomach of the user but also in one or more positions corresponding to both arms of the user. Furthermore, the tactile presentation devices 10 are not limited to being an outer garment as illustrated in FIG. 1, and may be pants, socks, shoes, a belt, a hat, gloves, or a mask, or the like. Additionally, although one each of the speech output units 102 are arranged on shoulder sections, on the left and right sides respectively, of the tactile presentation devices 10 illustrated in FIG. 1, the present embodiment is not limited to this configuration, rather, only one of the speech output units 102 may be installed, or three or more thereof may be installed. Further, the speech output units 102 may be arranged in the prescribed space as independent devices instead of being contained in the tactile presentation devices 10, or may be contained in a wearable device that is different from the tactile presentation devices 10 (for example, headphones or a headset, or the like) or in a mobile device (for example, a portable music player, a smartphone, or a mobile gaming device, or the like). Moreover, a combination of a plurality of tactile presentation devices 10 may be used.

In addition, the tactile presentation devices 10 are not limited to being the foregoing illustrated clothing accessories, and other possible examples thereof include a controller, a gun-type controller, a bed, and a chair, or the like.

Tactile Stimulation Units 100

When the respective plurality of tactile stimulation units 100 included in the tactile presentation devices 10 generate vibrations individually, the vibrations generated may be perceived only by peripheral parts of the tactile stimulation units 100. In other words, when individual tactile stimulation units 100 are arranged spaced apart from one another, the vibrations generated separately by the individual tactile stimulation units 100 may be perceived discretely in the body of the user.

Meanwhile, an illusory phenomenon known as phantom sensation has been medically investigated. This phantom sensation is an illusory phenomenon where, when stimulations are presented simultaneously in different positions on skin, a human being perceives only one stimulation between the positions where the stimulations are presented. For example, when two tactile stimulation units 100 arranged on the body of a user are made to output stimulations simultaneously, it is known that the position of the stimulation perceived by the user (hereinafter called the perceived position) is normally in a position between the two tactile stimulation units 100.

Furthermore, by changing the output intensity of the plurality of tactile stimulation units 100, the range of tactile stimulation which can be presented by the plurality of tactile stimulation units 100 may be continuously expanded without changing the dispositional spacing between individual tactile stimulation units 100. For instance, an example of the relationship between the respective output intensities of two tactile stimulation units 100 and the perceived position (an example of a phantom sensation) will be described. For example, it is assumed that, as time elapses, the output intensity of a first tactile stimulation unit 100 grows continuously weaker from "1", "0.6", and then "0", for example, and that the output intensity of a second tactile stimulation unit 100 grows continuously stronger from "0", "0.6", and then "1". In this case, the perceived position (perceived by the user) can continuously move from a contact position of the first tactile stimulation unit 100 to a contact position of the second tactile stimulation unit 100.

Note that the tactile stimulation units 100 provided to the tactile presentation device 10A are also referred to hereinbelow as "tactile stimulation units 100A". In addition, the tactile stimulation units 100 provided to the tactile presentation device 10B are also referred to hereinbelow as "tactile stimulation units 100B".

(2) Information Processing Device 20

The information processing device 20 is a device for configuring tactile stimulation which is presented by the tactile presentation device 10A on the basis of an operation by a first user. The information processing device 20 provides a GUI enabling a perceived position and a perceived intensity to be designated intuitively. The information processing device 20 automatically generates a tactile control signal which is inputted to a corresponding plurality of tactile stimulation units 100A on the basis of a perceived position and a perceived intensity which have been designated via the GUI by a tactile stimulation designer. More precisely, when a perceived effect is designated (that is, when a perceived position and a perceived intensity are designated), a tactile control signal for causing the plurality of tactile stimulation units 100A to output tactile stimulation so as to present this perceived effect is automatically generated. Thus, by actually designating what is to be felt (where and at which intensity), control by the user of the individual tactile stimulation units 100A can be omitted, thereby enabling automation. Accordingly, the designer enables tactile stimulation to be configured while designating the perceived effect via an intuitive operation.

Note that the tactile control signal is a control signal (a drive signal) for driving the tactile stimulation units 100. The tactile control signal may also be regarded as a waveform. That is, the tactile control signal may include information such as frequency and amplitude.

(3) Information Processing Device 30

The information processing device 30 is a device that performs output control of the tactile presentation device 10B.

Technical Problem

Typically, tactile stimulation is configured on the assumption that the user will use a specified tactile presentation device. Hence, when a tactile presentation device which is different from that assumed is used and the tactile stimulation units are replaced, there is a risk that tactile stimulation which is different from the tactile stimulation that is supposed to be presented will be presented to the user. As a result, the user perceives a perceived effect which is different from the perceived effect that is supposed to be perceived, and the user experience may deteriorate.

One workaround for this problem that may be considered is to configure tactile stimulation for each tactile presentation device that can be used by the user. However, configuration for providing the same perceived effect is performed a plurality of times using this workaround, and there is an excessive burden on the designer.

Another workaround that may be considered is to pre-prepare a tactile control signal which corresponds to a configured pattern of perceived effects for each of the tactile stimulation units 100 and to replace the configured perceived effects with the tactile control signal. However, with such a workaround, in addition to there being cases where some of the configured content is missing in the replacement process, there is sometimes no harmony in the outputted tactile stimulation between a plurality of tactile stimulation units.

Proposal Method

Therefore, the information processing device 30 according to the present embodiment absorbs differences in the characteristics of each of the tactile presentation devices 10 by performing output control according to the characteristics of the tactile presentation device 10B. More specifically, the information processing device 30 generates a tactile control signal for causing a plurality of tactile stimulation units 100B to output tactile stimulation so as to present the perceived effect designated by the first user on the basis of information indicating a result of configuration by the information processing device 20 and the characteristics of the tactile presentation device 10B. An overview of the proposal method will be described with reference to FIG. 2.

FIG. 2 is a diagram serving to illustrate an overview of a proposal method. As illustrated on the left in FIG. 2, the tactile presentation device 10A is provided with only actuators A as the tactile stimulation units 100A (100a to 100f). Further, the tactile stimulation is configured by the information processing device 20 so that the perceived position moves along a movement path 11 that extends from the right shoulder at the front of the first user of the tactile presentation device 10A to the left hip. However, as illustrated on the right in FIG. 2, the tactile presentation device 10B is provided with a mixture of actuators A, B, and C as the tactile stimulation units 100B (100a to 100f). In this case, the information processing device 30 performs, on the basis of the output characteristics of the actuators A, B, and C, output control of the tactile stimulation units 100B such that tactile stimulation is outputted to the second user so that the perceived position moves along a movement path 12 similar to the movement path 11.

Thus, according to the proposal method, differences in the characteristics of each of the tactile presentation devices 10 are absorbed by the information processing device 30. Thus, irrespective of the characteristics of the tactile presentation devices 10, a uniform perceived effect is presented to the user, thereby enabling inconsistencies in user experience to be suppressed. In addition, because there is no need to configure tactile stimulation for each of the tactile presentation devices 10 with different characteristics, the burden on the designer is reduced.

2. Configuration Example

A configuration example of each of the devices included in the information processing system according to the present embodiment will be described hereinbelow with reference to FIGS. 3 to 10.

<2.1. Configuration Example of Tactile Presentation Device 10>

Figure 3:
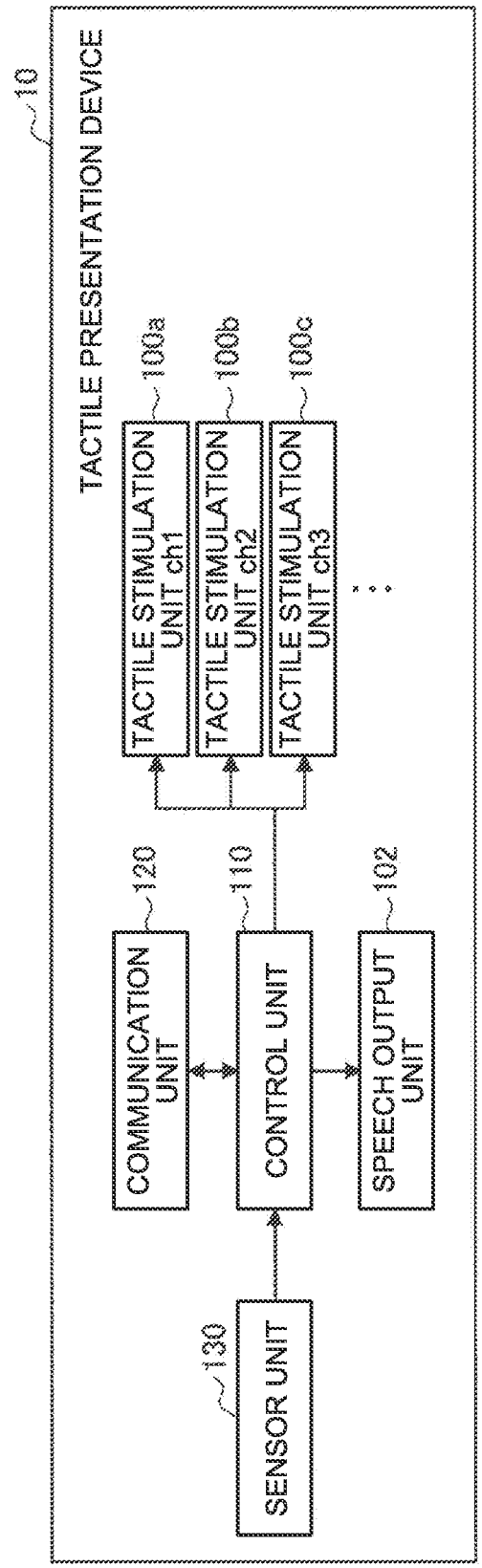
FIG. 3 is a block diagram illustrating an example of a configuration of a tactile presentation device according to the present embodiment.

FIG. 3 is a block diagram illustrating an example of a configuration of the tactile presentation device 10 according to the present embodiment. As illustrated in FIG. 3, the tactile presentation device 10 according to the present embodiment has a plurality of tactile stimulation units 100*a* to 100*c*, a control unit 110, a communication unit 120, and a speech output unit 102.

The control unit 110 functions as an arithmetic processing device and as a control device and controls the whole operation within the tactile presentation device 10 according to various programs. The control unit 110 is realized, for example, by a central processing unit (CPU) and an electronic circuit such as a microprocessor. Furthermore, the control unit 110 may also include a read only memory (ROM) that stores programs and operating parameters, and the like, which are used and a random access memory (RAM) that temporarily stores parameters which are suitably changed, and the like.

For example, the control unit 110 controls the output of the tactile stimulation (vibration, for example) of the plurality of tactile stimulation units 100 according to the tactile control signal for outputting tactile stimulation that corresponds to each of the tactile stimulation units 100 which has been received from the information processing device 20 or the information processing device 30 via the communication unit 120.

The communication unit 120 sends and receives information to and from other devices. For example, the communication unit 120 receives the tactile control signal for outputting tactile stimulation that corresponds to each of the tactile stimulation units 100 from the information processing device 20. Furthermore, the communication unit 120 receives, from the information processing device 20 or the information processing device 30, a speech control signal for outputting speech which is to be played back. The communication unit 120 communicably connects to other devices by means of wired/wireless local area network (LAN) or Wi-Fi (registered trademark), Bluetooth (registered trademark), short-range wireless communication, a mobile communication network (long term evolution (LTE) or 3G (third-generation mobile communication system)), or the like, for example.

The tactile stimulation units 100 are actuators that present tactile stimulation to the user. For example, the tactile stimulation units 100 generate vibration as tactile stimulation. The tactile stimulation units 100 may be realized by means of an eccentric motor, a linear resonant actuator (LRA) or a voice coil motor (VCM). Note that the tactile stimulation presented by the tactile stimulation units 100 is not limited to vibration and that stimulation such as, for example, temperature, force, electricity, air, water, and pressure, for example, may also be assumed.

A sensor unit 130 detects information relating to the tactile presentation device 10. For example, the sensor unit 130 detects information relating to the output characteristics of the tactile stimulation units 100. Examples of detected information include the intensity and frequency of vibration that is outputted from the tactile stimulation units 100, a temperature variation range, and the intensity of electro-stimulation, and the like.

The speech output units 102 has a speaker for playing back a speech signal and an amplifier circuit for the speaker.

An example of a configuration of the tactile presentation device 10 according to the present embodiment has been described hereinabove. Note that the configuration of the tactile presentation device 10 according to the present embodiment is not limited to the example illustrated in FIG. 3. For example, the tactile presentation device 10 may have a configuration without the speech output unit 102.

<2.2. Configuration Example of Information Processing Device 20>

Figure 4:
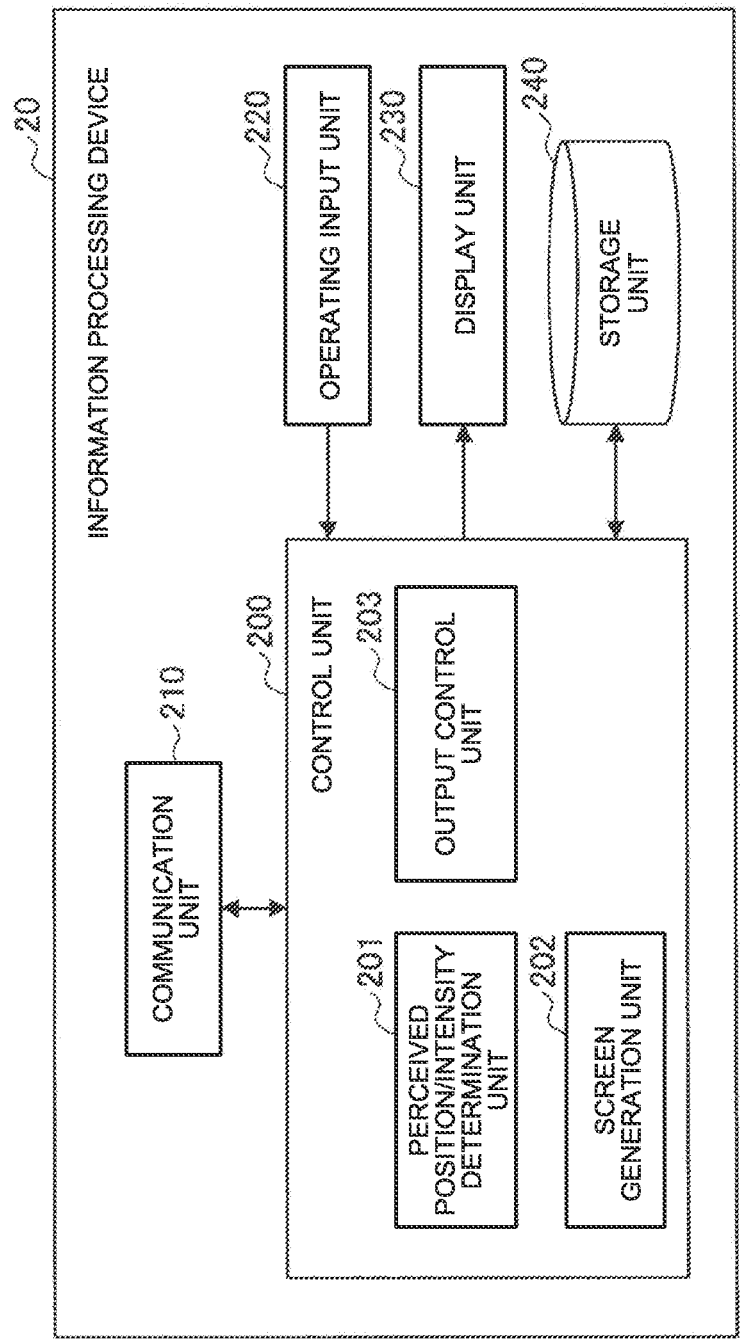
FIG. 4 is a block diagram illustrating an example of a configuration of an information processing device according to the present embodiment.

FIG. 4 is a block diagram illustrating an example of a configuration of the information processing device 20 according to the present embodiment. As illustrated in FIG. 4, the information processing device 20 includes a control unit 200, a communication unit 210, an operating input unit 220, a display unit 230, and a storage unit 240.

(Control Unit 200)

The control unit 200 functions as an arithmetic processing device and as a control device and controls the whole operation within the information processing device 20 according to various programs. The control unit 200 is realized, for example, by a central processing unit (CPU) and an electronic circuit such as a microprocessor. Furthermore, the control unit 200 may also include a read only memory (ROM) that stores programs and operating parameters, and the like, which are used and a random access memory (RAM) that temporarily stores parameters which are suitably changed, and the like.

In addition, the control unit 200 according to the present embodiment also functions as a perceived position/intensity determination unit 201, a screen generation unit 202, and an output control unit 203.

Perceived Position/Intensity Determination Unit 201

The perceived position/intensity determination unit 201 determines (calculates) the vibration intensity for a plurality of tactile stimulation units 100A that correspond to a target perceived position (so that the designated perceived intensity is perceived in the designated perceived position) according to the designated perceived position and perceived intensity, and functions as a generation unit that generates a tactile control signal which is outputted to the plurality of tactile stimulation units 100A. The designated perceived position also includes a perceived position movement path.

The perceived position and the perceived position movement path may be configured on the surface of the body of the first user. For example, tactile stimulation can be presented to the first user so that the perceived position continuously moves from a position serving as a starting point on the body of the first user to a position serving as an end point. Alternatively, the perceived position movement path can also be configured as a path linking a first surface of the body of the first user, the inside of the body of the first user, and a second surface that faces the first surface. Here, the first surface may be the front surface of the first user, and the second surface may be the back surface of the first user. Alternatively, the first surface may be a surface on the front side of a predetermined body part such as an arm, for example, and the second surface may be a surface on the back side of the body part. For example, when the movement path is a path linking a position on the front surface of the first user, the inside of the body of the first user, and a position on the back surface of the first user, the sensation of pushing from the front surface toward the back surface and inside the body can be presented to the first user.

Furthermore, the perceived position/intensity determination unit 201 is also capable of configuring a perception range.

In addition, the perceived position/intensity determination unit 201 may also associate the perceived position with timing according to the content (movie, game content, or the like) which is provided in synchronization with the tactile stimulation. Thus, by using the tactile presentation device 10A, predetermined tactile stimulation can be delivered with predetermined timing to the first user who is viewing the content.

The perceived position/intensity determination unit 201 first specifies a plurality (three, for example) of tactile stimulation units 100A which are positioned in the vicinity of the designated perceived position. Then, the perceived position/intensity determination unit 201 determines the output intensity of each of the plurality of tactile stimulation units 100A on the basis of the positional relationships between each of the plurality of tactile stimulation units 100A and the designated perceived position, and the designated perceived intensity. In other words, the perceived position/intensity determination unit 201 adjusts the output intensities of the plurality of tactile stimulation units 100A (generates an output control signal which is outputted to the respective tactile stimulation units 100A) on the basis of the designated perceived position and perceived intensity and the distances to the plurality of tactile stimulation units 100A arranged in the vicinity. The technology described in PCT/JP2017/14379 may be used for the adjustment of the output intensities of the plurality of tactile stimulation units 100A for presenting predetermined tactile stimulation in a target position on the body of the first user.

For example, when a first tactile stimulation unit 100A and a second tactile stimulation unit 100A are positioned in the vicinity of a designated perceived position, the perceived position/intensity determination unit 201 determines the output intensity of the first tactile stimulation unit 100A on the basis of the distance between the contact position of the first tactile stimulation unit 100A on the body of the first user and the target perceived position. In addition, the perceived position/intensity determination unit 201 determines the output intensity of the second tactile stimulation unit 100A on the basis of the distance between the contact position of the second tactile stimulation unit 100A on the body of the first user and the target perceived position.

The foregoing functions will be described in more detail hereinbelow. First, an example of adjustment of the output intensity of two tactile stimulation units 100A in a case where a target perceived position is located between the contact positions of the two tactile stimulation units 100A will be described. For example, the perceived position/intensity determination unit 201 determines the output intensity of the first tactile stimulation unit 100A and the output intensity of the second tactile stimulation unit 100A, respectively, on the basis of the positional relationship between an intermediate position between the contact position of the first tactile stimulation unit 100A and the contact position of the second tactile stimulation unit 100A, and a target perceived position.

For example, the perceived position/intensity determination unit 201 may determine the output intensity of the first tactile stimulation unit 100A and the second tactile stimulation unit 100A such that the shorter the distance between the intermediate position and the target perceived position is, the greater the total value of the output intensity of the first tactile stimulation unit 100A and the output intensity of the second tactile stimulation unit 100A. Alternatively, when the target perceived position is located closer to the contact position of the first tactile stimulation unit 100A than the contact position of the second tactile stimulation unit 100A, the perceived position/intensity determination unit 201 may determine the output intensity of the first tactile stimulation unit 100A such that the greater the distance between the contact position of the first tactile stimulation unit 100A and the target perceived position is, the greater the output intensity of the first tactile stimulation unit 100A. Furthermore, the same is also true for the second tactile stimulation unit 100A (that is, in an inverse relationship).

At the same time, the perceived position/intensity determination unit 201 changes the ratio between the output intensity of the first tactile stimulation unit 100A and the output intensity of the second tactile stimulation unit 100A on the basis of the positional relationship between the intermediate position and the target perceived position.

Screen Generation Unit 202

The screen generation unit 202 may generate a configuration screen for a target perceived position and perceived intensity. The configuration screen displays, as information relating to the tactile presentation device 10A, images representing the positions of the plurality of tactile stimulation units 100A provided in the tactile presentation device 10A and an image representing the outline of the tactile presentation device 10A, and the first user may designate, via the configuration screen, the position (perceived position) of tactile stimulation that is to be presented. The first user may be able to freely arrange the positions of the plurality of tactile stimulation units 100A as virtual positions. In addition, when the positions of the plurality of tactile stimulation units 100A are preconfigured and known, images representing the positions of the respective tactile stimulation units 100A are displayed. Furthermore, when the positions of the plurality of tactile stimulation units 100A are preconfigured and known but have been configured so as to not be presented to the user (for example, when the positions of the respective tactile stimulation units 100A are a trade secret), an image representing only the outline of the tactile presentation device 10A may be displayed. A perceived position movement path can also be inputted via the configuration screen. A plurality of perceived positions (a movement path of a plurality of perceived positions) can also be configured. Further, the perceived position and perceived intensity can also be configured such that tactile stimulation is generated in a predetermined position with predetermined timing that corresponds to playback of predetermined content. Such designation of the perceived position and perceived intensity via the configuration screen may be performed using a mouse operation, a touch operation, or a controller such as a 3D pointer, for example. An example of a specific configuration screen according to the present embodiment will be described in detail subsequently.

Note that the screen generation unit 202 is also capable of generating a screen that displays a tactile control signal (waveform) which is outputted to each of the tactile stimulation units 100A and which has been generated by the perceived position/intensity determination unit 201.

Output Control Unit 203

The output control unit 203 performs tactile stimulation output control on the tactile presentation device 10A according to determination content of the perceived position/intensity determination unit 201. Thus, the first user is able to confirm the effect (perceived effect) of the designated tactile stimulation by actually feeling same by wearing the tactile presentation device 10A, for example. Specifically, the output control unit 203 outputs the generated tactile control signal (controls the generation of vibration) to the predetermined plurality of tactile stimulation units 100A as determined by the perceived position/intensity determination unit 201. In addition, the output control unit 203 is also capable of performing playback control of content (video) that is played back by a display device (a display, an HMD, a projector, a PC, or a smartphone, or the like) and of performing, in response to playback of this content, output control of tactile stimulation from the tactile presentation device 10A with predetermined configured timing. Furthermore, the output control unit 203 is also capable of performing control to play back, from the speech output units 102 of the tactile presentation device 10A, speech such as an impact sound that corresponds to the tactile stimulation presented. In addition, the output control unit 203 may perform control to display, on the display unit 230, various screens which are generated by the screen generation unit 202.

(Communication Unit 210)

The communication unit 210 sends and receives information to and from other devices. For example, the communication unit 210 transmits a tactile control signal for outputting tactile stimulation to each of the plurality of tactile stimulation units 100A (or the tactile presentation device 10A) according to the control by the output control unit 203. Furthermore, the communication unit 210 transmits, to a display device (not illustrated), a display control signal for displaying playback target images according to the control by the output control unit 203 and transmits a speech control signal for outputting playback target speech to each of the plurality of speech output units 102 of the tactile presentation device 10A (or to the tactile presentation device 10A).

The communication unit 210 communicably connects to other devices by means of wired/wireless local area network (LAN) or Wi-Fi (registered trademark), Bluetooth (registered trademark), short-range wireless communication, a mobile communication network (long term evolution (LTE) or 3G (third-generation mobile communication system)), or the like, for example.

(Operating Input Unit 220)

The operating input unit 220 receives an operating instruction by the first user and outputs the operation content to the control unit 200. The operating input unit 220 may be a touch sensor, a pressure sensor, or a proximity sensor. Alternatively, the operating input unit 220 may be a physical configuration such as a keyboard, a mouse, a button, a switch, and a lever, or the like.

(Display Unit 230)

The display unit 230 is a display device that outputs a configuration screen, or the like, that enables configuration of a perceived effect. The display unit 230 may be a display device such as a liquid-crystal display (LCD) or an organic electroluminescence (EL) display, for example.

(Storage Unit 240)

The storage unit 240 is realized by a read only memory (ROM) that stores programs and operating parameters, and the like, which are used in the processing by the control unit 200 and a random access memory (RAM) that temporarily stores parameters which are suitably changed, and the like.

The configuration of the information processing device 20 according to the present embodiment has been described in specific terms hereinabove. Note that the configuration of the information processing device 20 is not limited to or by the example illustrated in FIG. 4. For example, the information processing device 20 may be configured by a plurality of devices. Furthermore, the information processing device 20 may further include a speech input unit and a speech output unit.

Furthermore, the information processing device 20 is not limited to a PC like that illustrated in FIG. 1 and may be realized by a smartphone, a mobile phone terminal, a tablet terminal, or a dedicated terminal, or the like. In addition, at least a portion of the control unit 200 of the information processing device 20 may be realized by a server on a network. Further, the display unit 230 may be realized by a projector, and a configuration screen or the like may be projected onto a wall, a table, or a screen, or the like. In this case, for the operating input by the first user to the projection screen, a touch operation with respect to the projection screen may be detected by means of a camera provided separately.

(Example of Perceived Effect Configuration Screen)

An example of a perceived effect configuration screen according to the present embodiment will be described next in specific terms with reference to FIGS. 5 and 6.

Figure 5:
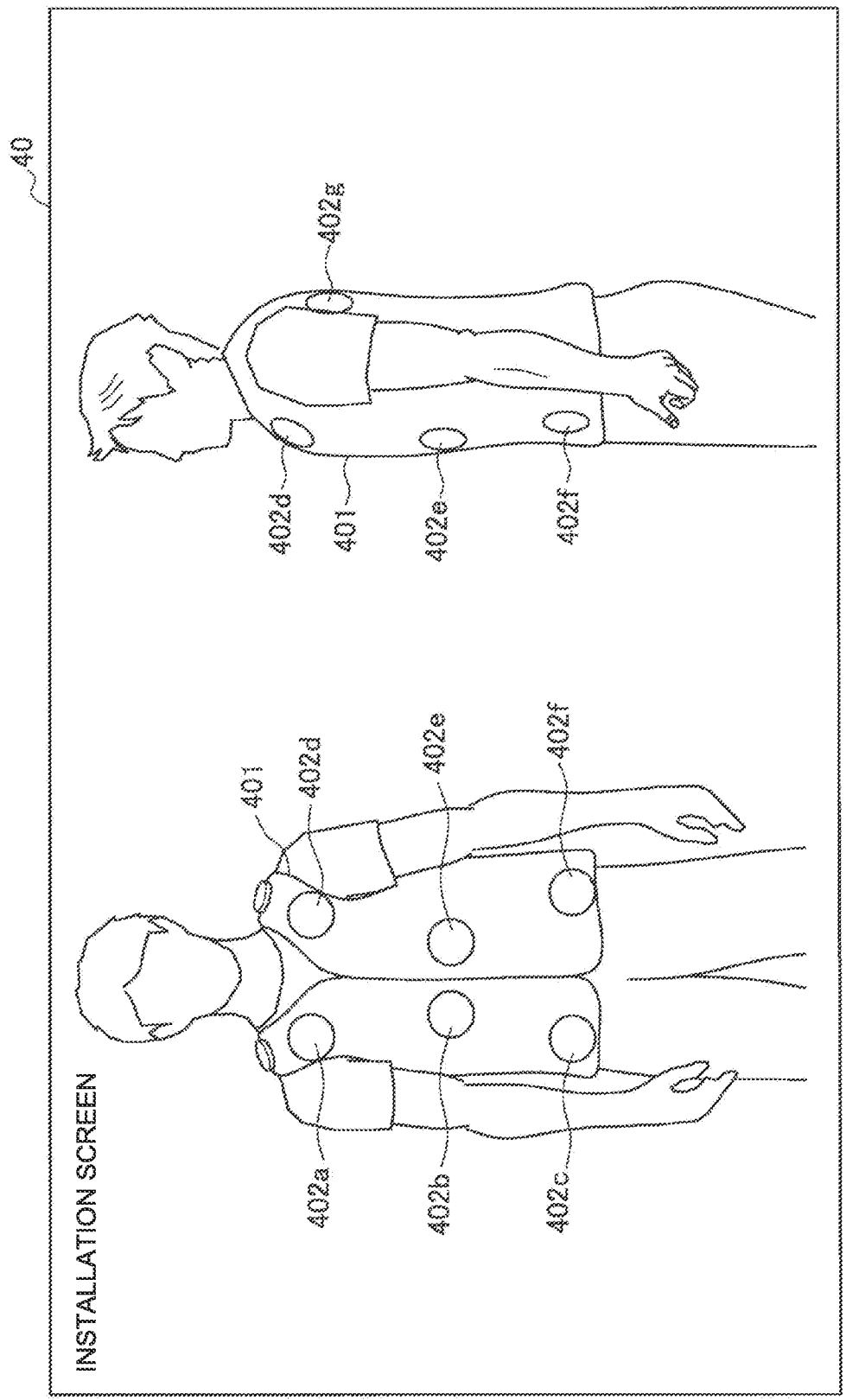
FIG. 5 is a diagram illustrating an example of a configuration screen 40 for configuring the positions of tactile stimulation units according to the present embodiment.

FIG. 5 is a diagram illustrating an example of a configuration screen 40 for configuring the positions of tactile stimulation units 100A according to the present embodiment. As illustrated in FIG. 5, the configuration screen 40 displays 402a to 402g representing the tactile stimulation units 100A on a display 401 in the shape of a jacket-type tactile presentation device 10A, for example. The displays 402a to 402g representing the tactile stimulation units 100A can be moved to optional positions by using a mouse operation, a touch operation, or another controller to operate a cursor 403. Note that the positions of the tactile stimulation units 100A may be known. In other words, 3D data of an already generated tactile presentation device 10A may be captured, and the outline of the tactile presentation device 10A and the positions of the tactile stimulation units 100A disposed in the tactile presentation device 10A may be displayed.

Although a front surface image and a side surface image are displayed by way of an example in the example illustrated in FIG. 5, a back surface image may also be displayed. In addition, the front surface image, side surface image, and back surface image may be replaced in response to user operations.

Figure 6:
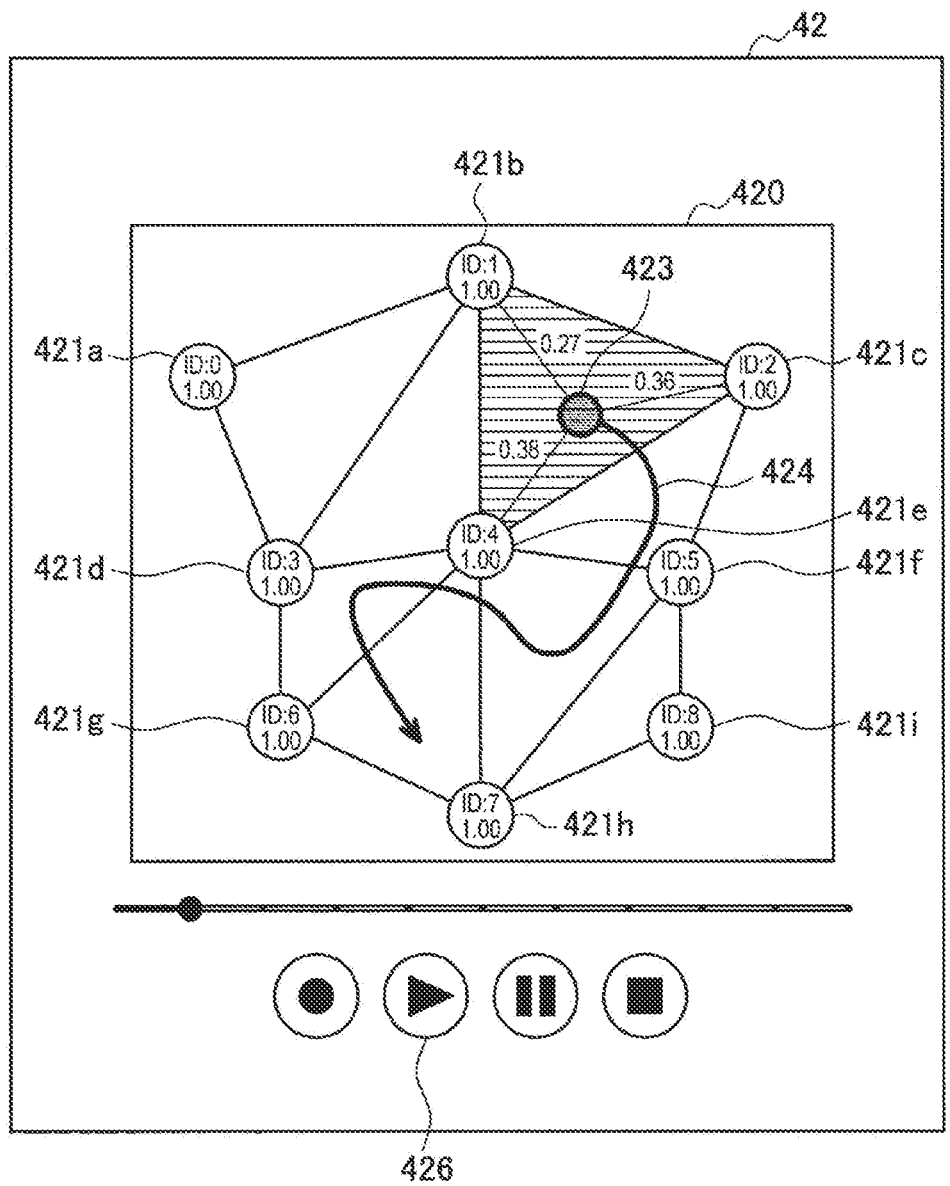
FIG. 6 is a diagram illustrating an example of a perceived effect configuration screen according to the present embodiment.

FIG. 6 is a diagram illustrating an example of a configuration screen 42 of a perceived effect according to the present embodiment. As illustrated in FIG. 6, a display 420 representing the placement of the plurality of tactile stimulation units 100A is displayed on the configuration screen 42. The first user uses a mouse operation or the like to designate a position where tactile stimulation is to be generated (that is, a perceived position). A perceived position display 423 is displayed in the designated position. Furthermore, when continuous movement of the perceived position is desired, the first user is also able to designate a movement path 424 by means of a mouse operation or the like. In addition, the first user is also able to configure the movement speed of the perceived position.

Furthermore, upon selecting a playback button 426 on the configuration screen 42, a moving image representing the trajectory of the perceived position is played back. That is, a moving image in which the perceived position display 423 moves along the movement path 424 can be played back. Thus, the first user is then able to confirm configured content. In addition, the information processing device 20 may be configured to play back, when the playback button 426 has been selected, a moving image representing the trajectory of the perceived position via the configuration screen 42 displayed on the display unit 230 and to perform control of the output of the corresponding tactile stimulation from the connected tactile presentation device 10A. Accordingly, the first user is able to receive perceived effect feedback immediately.

<2.3. Configuration Example of Information Processing Device 30>

Figure 7:
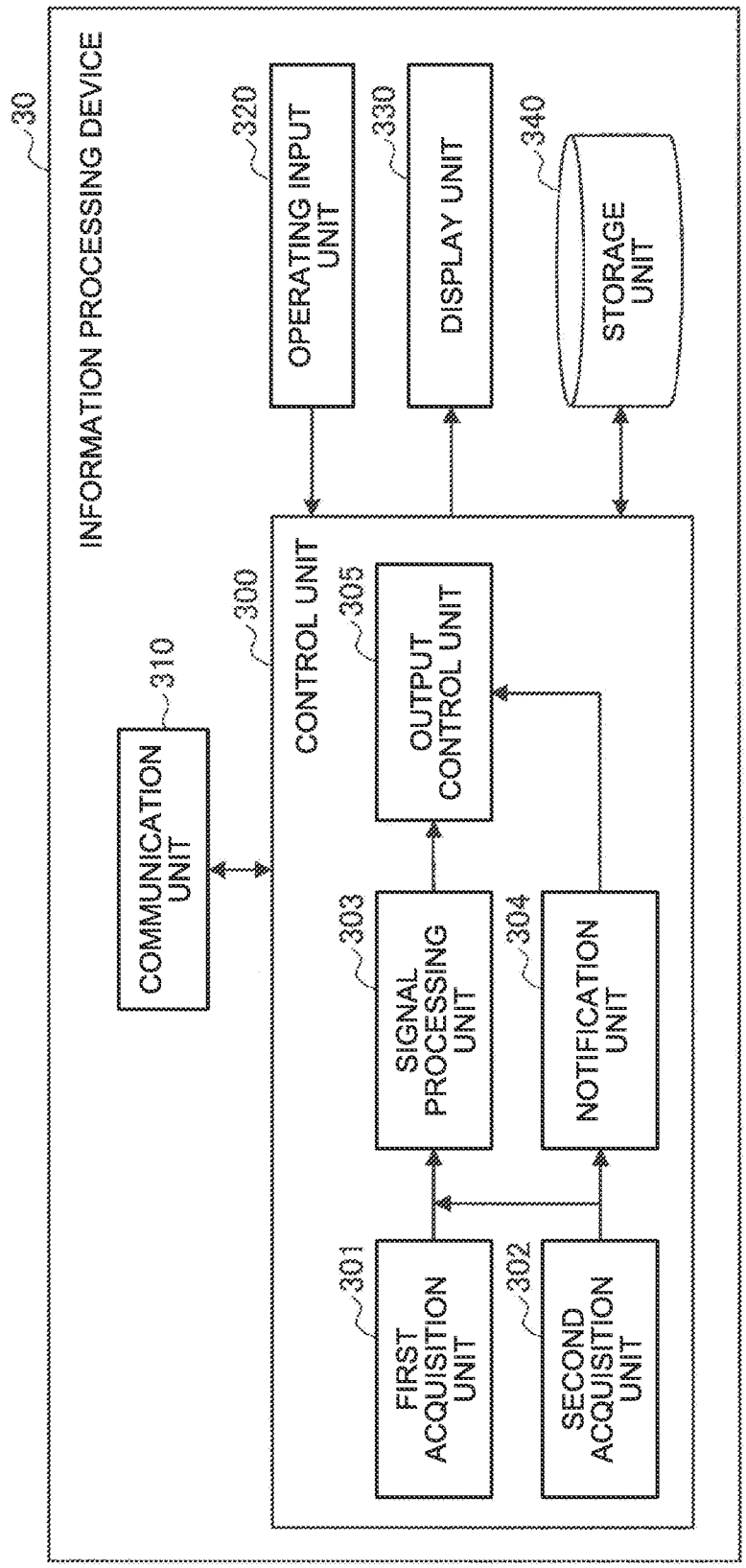
FIG. 7 is a block diagram illustrating an example of a configuration of the information processing device according to the present embodiment.

FIG. 7 is a block diagram illustrating an example of a configuration of the information processing device 30 according to the present embodiment. As illustrated in FIG. 7, the information processing device 30 includes a control unit 300, a communication unit 310, an operating input unit 320, a display unit 330, and a storage unit 340.

(Control Unit 300)

The control unit 300 functions as an arithmetic processing device and as a control device and controls the whole operation within the information processing device 30 according to various programs. The control unit 300 is realized, for example, by a central processing unit (CPU) and an electronic circuit such as a microprocessor. Furthermore, the control unit 300 may also include a read only memory (ROM) that stores programs and operating parameters, and the like, which are used and a random access memory (RAM) that temporarily stores parameters which are suitably changed, and the like.

In addition, the control unit 300 according to the present embodiment also functions as a first acquisition unit 301, a second acquisition unit 302, a signal processing unit 303, a notification unit 304, and an output control unit 305.

(1) First Acquisition Unit 301

The first acquisition unit 301 acquires control information relating to tactile stimulation which is to be perceived by a second user configured by the first user. The tactile stimulation which is to be perceived by the second user configured by the first user is a perceived effect configured by the first user in the information processing device 20. Furthermore, the foregoing control information is information indicating the result of perceived effect configuration by the first user of the information processing device 20. This control information will also be called tactile control information hereinbelow.

The tactile control information includes a tactile control signal for a reference tactile stimulation unit. A reference tactile stimulation unit is a tactile stimulation unit for which usage is assumed when the tactile control information of the information processing device 20 is generated. The reference tactile stimulation unit is typically a tactile stimulation unit 100A of the tactile presentation device 10A. Therefore, in cases where the characteristics of the tactile stimulation unit 100A and the characteristics of the tactile stimulation unit 1008 are the same, when the tactile control signal for the reference tactile stimulation unit is inputted to the tactile stimulation unit 1008, the perceived effect designated by the first user is perceived by the second user as configured. Note that the reference tactile stimulation unit may not be a tactile stimulation unit 100A and may, for example, be a tactile stimulation unit 100 of a virtual tactile presentation device 10.

The tactile control information includes information indicating the characteristics of the reference tactile stimulation unit. Characteristics of the reference tactile stimulation unit include tactile stimulation output characteristics, tactile stimulation transmission characteristics, placement information, and battery information, and the like. Possible tactile stimulation output characteristics include, for example, response characteristics such as a rise time and a fall time, vibrational frequency characteristics, temperature variation characteristics, haptic output characteristics, and electrostimulation frequency characteristics, or the like. Possible tactile stimulation transmission characteristics include coefficients for transmitting, to the first user, vibration, temperature, or electrostimulation which are outputted by the reference tactile stimulation unit. Possible placement information includes the positions of reference tactile stimulation units in the reference tactile presentation device (the tactile presentation device 10A, for example), the relative positional relationships between the reference tactile stimulation units, and the body parts of the first user with which the reference tactile stimulation units are in contact. Possible battery information includes the battery capacity, the residual battery capacity, and the battery consumption rate, or the like. Note that the battery may be provided in each of the reference tactile stimulation units or may be provided so as to correspond to a plurality of reference tactile stimulation units.

The tactile control information preferably includes information that associates the tactile control signal for the reference tactile stimulation unit with information indicating the characteristics of the reference tactile stimulation unit. When there are a plurality of reference tactile stimulation units, the tactile control information includes information that associates the respective control signals of the plurality of tactile stimulation units with characteristics. The control signal conversion processing described subsequently is thus enabled.

The first acquisition unit 301 may acquire tactile control information from the information processing device 20. In this case, the first acquisition unit 301 is capable of acquiring the perceived effect configured by the first user in real time. Moreover, the tactile control information may be prestored in the storage unit 340 or may be stored on a server on a network, or the like. In this case, the first acquisition unit 301 acquires tactile control information from the storage unit 340 or the server on the network, or the like. The first acquisition unit 301 may acquire, together with the tactile control information, content such as video or music which is provided to the second user in synchronization with the tactile stimulation output from the tactile presentation device 10B.

The information indicating the characteristics of the reference tactile stimulation unit may be known information. For example, the information indicating the characteristics of the reference tactile stimulation unit may be prestored in the storage unit 340 or may be stored on a server on a network, or the like. In this case, the first acquisition unit 301 acquires information indicating the characteristics of the reference tactile stimulation unit from the storage unit 340 or the server on the network, or the like.

Note that the tactile control signal for the reference tactile stimulation unit is also called the first tactile control signal hereinbelow.

The first acquisition unit 301 outputs the tactile control information to the signal processing unit 303.

(2) Second Acquisition Unit 302

The second acquisition unit 302 acquires the characteristics of the tactile stimulation unit 100B that outputs tactile stimulation to the second user. Characteristics of the tactile stimulation unit 100B include tactile stimulation output characteristics, tactile stimulation transmission characteristics, placement information, and battery information, and the like. Possible tactile stimulation output characteristics include, for example, response characteristics such as a rise time and a fall time, vibrational frequency characteristics, temperature variation characteristics, haptic output characteristics, and electrostimulation frequency characteristics, or the like. Possible tactile stimulation transmission characteristics include coefficients for transmitting, to the second user, vibration, temperature, or electrostimulation which are outputted by the tactile stimulation unit 100B. Possible placement information includes the positions of the tactile stimulation units 100B in the tactile presentation device 10B, the relative positional relationships between the tactile stimulation units 100B, and the body parts of the second user with which the tactile stimulation units 100B are in contact. Possible battery information includes the battery capacity, the residual battery capacity, and the battery consumption rate, or the like. Note that the battery may be provided in each of the tactile stimulation units 100B or may be provided so as to correspond to a plurality of tactile presentation devices 10B.

The second acquisition unit 302 may measure the characteristics of the tactile stimulation units 100B while causing the tactile stimulation units 100B to operate. For example, the second acquisition unit 302 inputs a predetermined tactile control signal to the tactile stimulation units 100B to cause same to output tactile stimulation and causes the outputted tactile stimulation to be detected by the sensor unit 130 which is provided in the tactile presentation device 10B. Further, the second acquisition unit 302 measures the characteristics of the tactile stimulation units 100B by comparing the foregoing predetermined tactile control signal with the detection result by the sensor unit 130.

Additionally, the second acquisition unit 302 may measure the characteristics of the tactile stimulation unit 100B electrically. For example, when the tactile stimulation units 100B are capable of outputting temperatures, the second acquisition unit 302 calculates a resistance value on the basis of the relationship between a current value and a voltage value and measures the temperature of the tactile stimulation units 100B on the basis of resistance value.

The characteristics of the tactile stimulation units 100B thus measured are stored in the storage unit 340. Thereafter, the second acquisition unit 302 skips the measurement processing and acquires the characteristics of the tactile stimulation units 100B from the storage unit 340.

The information indicating the characteristics of the tactile stimulation units 100B may be known information, for example, the information indicating the characteristics of the tactile stimulation units 100B may be prestored in a storage unit (not illustrated) which is provided in the tactile stimulation units 100B or may be stored on a server on a network, or the like. In this case, the second acquisition unit 302 acquires information indicating the characteristics of the tactile stimulation units 100B from the storage unit which is provided in the tactile stimulation units 100B, or the server on the network, or the like.

The acquisition of the characteristics of the tactile stimulation units 100B by the second acquisition unit 302 is performed with the timing at which the tactile presentation device 10B is connected to the information processing device 30 or with the timing at which a new tactile stimulation unit 100B is attached, or the like.

The second acquisition unit 302 outputs information indicating the characteristics of the tactile presentation device 10B to the signal processing unit 303. Furthermore, the second acquisition unit 302 outputs, to the notification unit 304, information indicating whether or not the characteristics of the tactile presentation device 10 are being measured.

(3) Signal Processing Unit 303

The signal processing unit 303 generates a tactile control signal which is inputted to the tactile stimulation units 100B and serves to cause the second user to perceive the tactile stimulation indicated by the tactile control information on the basis of the tactile control information and the characteristics of the tactile stimulation units 100B. The signal processing unit 303 generates the tactile control signal by converting (that is, modulating) the first tactile control signal included in the tactile control information on the basis of the characteristics of the tactile stimulation units 100B. When the tactile control signal thus generated is inputted to the tactile stimulation units 100B, the tactile stimulation units 100B output the tactile stimulation for causing the second user to perceive the tactile stimulation indicated by the tactile control information. Thus, because the differences in the characteristics of each of the tactile presentation devices 10, which are used when providing tactile stimulation to the user, are absorbed, the second user can be made to perceive the perceived effect as configured by the first user. The tactile control signal generated by the signal processing unit 303 is also called the second tactile control signal hereinbelow.

The signal processing unit 303 generates a second tactile control signal by converting tactile control information on the basis of the difference between the characteristics of the reference tactile stimulation unit and the characteristics of the tactile stimulation units 1008. More precisely, the signal processing unit 303 generates a second tactile control signal by converting the first tactile control signal on the basis of an inverse characteristic of the difference between the characteristics of the tactile stimulation units 1008 and the characteristics of the reference tactile stimulation unit. Thus, because the differences in the characteristics of the reference tactile stimulation unit and the tactile stimulation units 100B are absorbed, the second user can be made to perceive the perceived effect as configured by the first user. The conversion processing will be described hereinbelow in specific terms.

Intensity

For example, the signal processing unit 303 generates the second tactile control signal for causing the second user to perceive tactile stimulation the intensity of which is the same as or substantially the same as the tactile stimulation indicated by the tactile control information. More precisely, the signal processing unit 303 generates, on the basis of the output characteristics of the tactile stimulation units 100B, the second tactile control signal for causing the second user to perceive tactile stimulation for which at least some of the one or more characteristics relating to the intensity of the tactile stimulation indicated by the tactile control information are the same. Thus, an absolute value of the intensity of the tactile stimulation perceived by the second user can be configured as per the configuration by the first user. Possible characteristics of the intensity of the tactile stimulation include the vibration intensities of each of a plurality of frequency bands, the maximum and minimum values of a temperature variation, and the electrostimulation intensities of each of the plurality of frequency bands.

Figure 8:
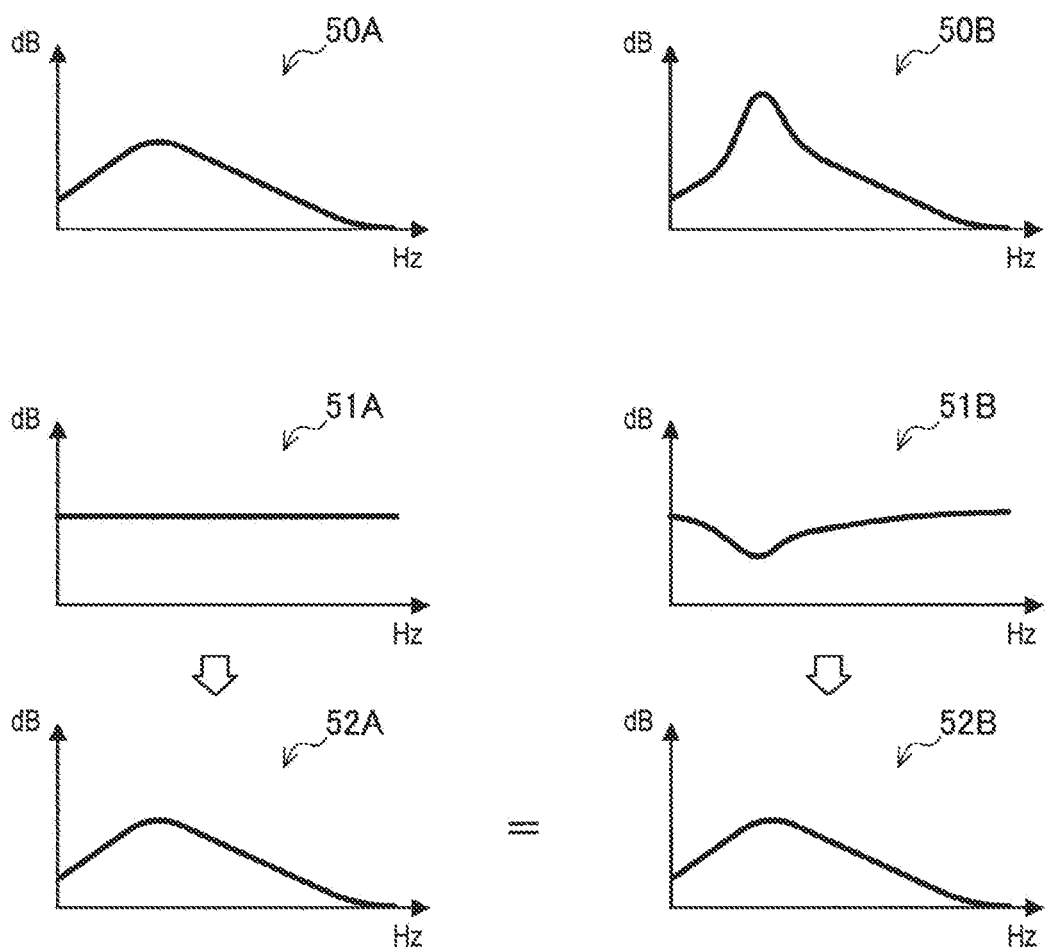
FIG. 8 is a diagram serving to illustrate an example of conversion processing according to the present embodiment.

Vibration A case where the tactile stimulation which is outputted by the tactile stimulation units 100B is vibration will be described with reference to FIG. 8. FIG. 8 is a diagram serving to illustrate an example of the conversion processing according to the present embodiment. Graph 50A illustrates the frequency characteristic of a reference tactile stimulation unit, and graph 50B illustrates the frequency characteristic of a tactile stimulation unit 100B. The horizontal axis of graphs 50A and 50B represents frequency and the vertical axis represents vibration intensity (acceleration). When these graphs are compared, it can be seen that, in comparison with the frequency characteristic of the reference tactile stimulation unit illustrated in graph 50A, the frequency characteristic of the tactile stimulation unit 100B illustrated in graph 50B has a large vibration intensity in some frequency bands.

Graph 51A illustrates the frequency characteristic of the first tactile control signal. The horizontal axis of graph 51A represents frequency and the vertical axis represents vibration intensity. The signal processing unit 303 generates a second tactile control signal by applying (for example, multiplying) an inverse characteristic of the difference between the frequency characteristic of the reference tactile stimulation unit and the frequency characteristic of the tactile stimulation units 100B to the first tactile control signal that is included in the tactile control information. In the example illustrated in FIG. 8, the signal processing unit 303 multiplies the first tactile control signal having the frequency characteristic illustrated in graph 51A by the inverse characteristic of the difference between the frequency characteristic illustrated in graph 50A and the frequency characteristic illustrated in graph 50B. As a result, the signal processing unit 303 generates the second tactile control signal having the frequency characteristic illustrated in graph 51B. The horizontal axis of graph 51B represents frequency and the vertical axis represents vibration intensity. When graphs 51A and 51B are compared, it can be seen that, in comparison with the first tactile control signal illustrated in graph 51A, the second tactile control signal illustrated in graph 51B has a small vibration intensity in some frequency bands. Because the vibration intensity in some frequency bands is small, the difference, as described with reference to graphs 50A and 50B, in the frequency characteristics of the reference tactile stimulation unit and the tactile stimulation units 100B is absorbed, as illustrated in graphs 52A and 52B.

Figure 9:
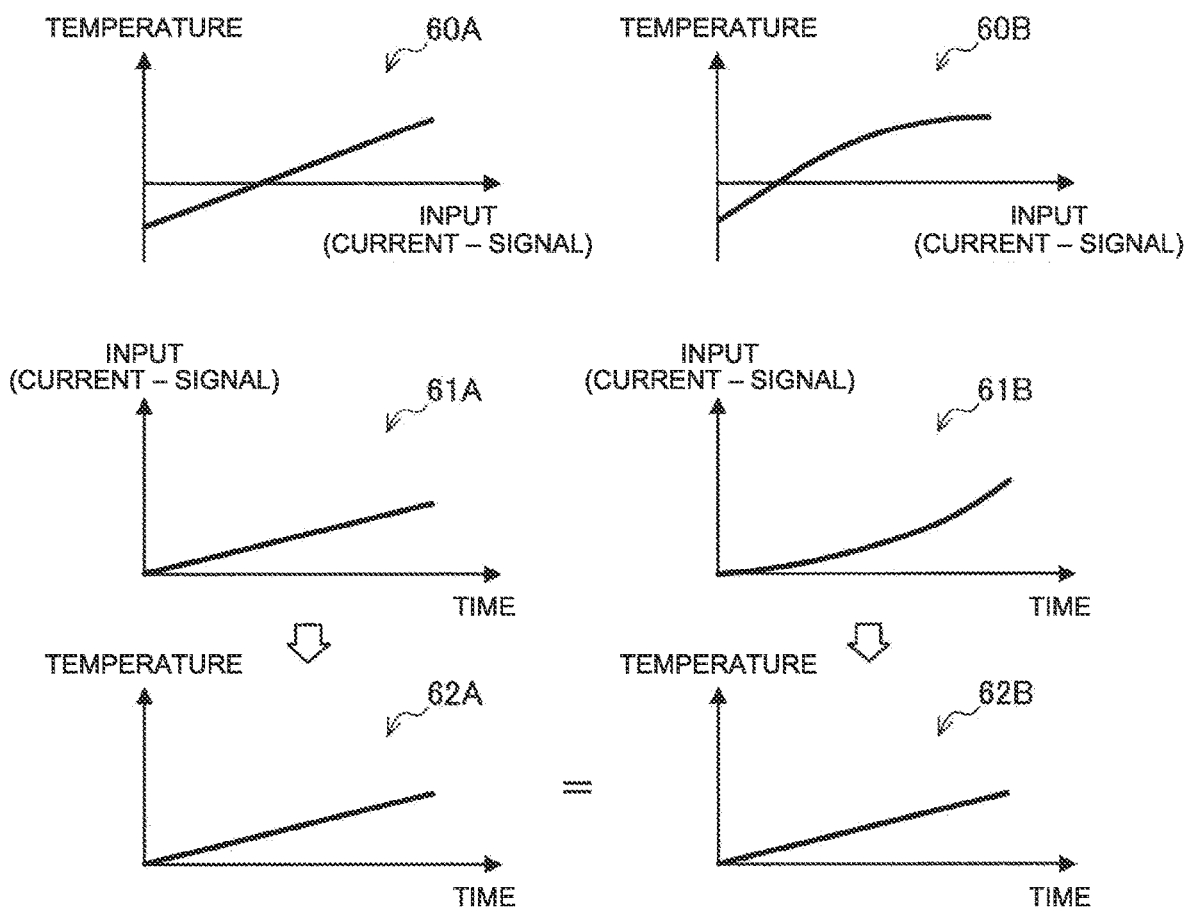
FIG. 9 is a diagram serving to illustrate an example of conversion processing according to the present embodiment.

Graph 52A illustrates the frequency characteristic of vibrations which are outputted when the first tactile control signal illustrated in graph 51A is inputted to the reference tactile stimulation unit. Graph 52B illustrates the frequency characteristic of vibrations which are outputted when the second tactile control signal illustrated in graph 51B is inputted to the tactile stimulation unit 100B. The horizontal axis of graphs 52A and 52B represents frequency and the vertical axis represents vibration intensity. As illustrated in FIG. 8, the frequency characteristic illustrated in graph 52A and the frequency characteristic illustrated in graph 52B match each other. Therefore, the second user is able to perceive the perceived effect as configured by the first user. Temperature A case where the tactile stimulation which is outputted by the tactile stimulation units 100B is temperature will be described with reference to FIG. 9. FIG. 9 is a diagram serving to illustrate an example of the conversion processing according to the present embodiment. Graph 60A represents the temperature variation characteristic of a reference tactile stimulation unit, and graph 60B represents the temperature variation characteristic of a tactile stimulation unit 100B. The horizontal axis of graphs 60A and 60B represents the intensity of the inputted current or signal, and the vertical axis represents temperature. According to graph 60A, the reference tactile stimulation unit has a temperature that rises according to the intensity of the inputted current or signal and has a rise width corresponding to the current or signal intensity that is constant irrespective of the current or signal intensity. However, according to graph 60B, the tactile stimulation unit 100B has a temperature that rises according to the intensity of the inputted current or signal and has a rise width corresponding to the current or signal intensity that is attenuated as the current or signal intensity rises.

Graph 61A illustrates the characteristic of the first tactile control signal. The horizontal axis of graph 51A represents time, and the vertical axis represents the intensity of the current or signal inputted as the first tactile control signal. The signal processing unit 303 generates a second tactile control signal by applying (for example, multiplying) an inverse characteristic of the difference between the temperature variation characteristic of the reference tactile stimulation unit and the temperature variation characteristic of the tactile stimulation unit 100B to the first tactile control signal that is included in the tactile control information. In the example illustrated in FIG. 9, the signal processing unit 303 multiplies the first tactile control signal having the characteristic illustrated in graph 61A by the inverse characteristic of the difference between the temperature variation characteristic illustrated in graph 60A and the temperature variation characteristic illustrated in graph 60B. As a result, the signal processing unit 303 generates the second tactile control signal having the characteristic illustrated in graph 61B. The horizontal axis of graph 61B represents time, and the vertical axis represents the intensity of the current or signal inputted as the second tactile control signal. According to graph 61A, the intensity of the current or signal which is inputted as the first tactile control signal rises as time elapses, and the rise width corresponding to this time is constant irrespective of time elapsing. However, according to graph 61B, the intensity of the current or signal which is inputted as the second tactile control signal rises as time elapses, and the rise width corresponding to this time increases as time elapses. Due to this difference in rise width corresponding to time, the difference, as described with reference to graphs 60A and 60B, in the temperature variation characteristics of the reference tactile stimulation unit and the tactile stimulation unit 100B is absorbed, as illustrated in graphs 62A and 62B.

Graph 62A illustrates a temporal change in the temperature which is outputted when the first tactile control signal illustrated in graph 61A is inputted to the reference tactile stimulation unit. Graph 62B illustrates a temporal change in the temperature which is outputted when the second tactile control signal illustrated in graph 61B is inputted to the tactile stimulation unit 100B. The horizontal axis of graphs 62A and 62B represents time and the vertical axis represents temperature. As illustrated in FIG. 9, the temporal change in temperature illustrated in graph 62A and the temporal change in temperature illustrated in graph 62B match each other. Therefore, the second user is able to perceive the perceived effect of temperature as configured by the first user.

Difference

For example, the signal processing unit 303 generates the second tactile control signal for causing the second user to perceive tactile stimulation for which the difference between the maximum value and minimum value of the intensity is the same as or substantially the same as the tactile stimulation indicated by the tactile control information. More precisely, the signal processing unit 303 generates, on the basis of the output characteristics of the tactile stimulation units 100B, the second tactile control signal for causing the second user to perceive tactile stimulation for which at least a portion of the difference between the maximum value and minimum value of one or more characteristics relating to the intensity of the tactile stimulation indicated by the tactile control information is the same. Thus, a relative value of the intensity of the tactile stimulation perceived by the second user can be configured as per the configuration by the first user.

Timing

For example, the signal processing unit 303 generates the second tactile control signal for causing the second user to perceive tactile stimulation with the same or substantially the same timing as the tactile stimulation indicated by the tactile control information. More precisely, the signal processing unit 303 generates, on the basis of the response characteristics of the tactile stimulation units 100B, the second tactile control signal for causing the second user to perceive tactile stimulation for which at least a portion of one or more characteristics relating to the timing of the tactile stimulation indicated by the tactile control information is the same. Note that possible characteristics relating to the timing of tactile stimulation include timing for starting the tactile stimulation, timing at which the tactile stimulation intensity reaches a predetermined intensity, timing at which the tactile stimulation intensity is attenuated, and timing for ending the tactile stimulation. For example, the signal processing unit 303 preconfigures an offset for operating the tactile stimulation units 100B and configures an increase in the voltage applied at the time of initial operation. Thus, timing relating to the tactile stimulation perceived by the second user can be configured as per the configuration by the first user.

Perceived Position

The signal processing unit 303 generates the second tactile control signal for causing the second user to perceive tactile stimulation the perceived position of which is the same as or substantially the same as the tactile stimulation indicated by the tactile control information. More precisely, the signal processing unit 303 generates, on the basis of the output characteristics of the tactile stimulation units 100B, the second tactile control signal for causing the second user to perceive tactile stimulation for which at least some of the perceived positions are the same as the tactile stimulation indicated by the tactile control information. For example, the signal processing unit 303 generates the second tactile control signal in accordance with the tactile stimulation unit 100B with the lowest output intensity among the plurality of tactile stimulation units 100B provided in the tactile presentation device 10B. More precisely, the signal processing unit 303 lowers the intensity of the tactile stimulation outputted by another tactile stimulation unit 100B by using, as a reference, the intensity of the tactile stimulation outputted by the tactile stimulation unit 100B with the lowest output intensity. Thus, the perceived position of the tactile stimulation perceived by the second user can be configured as per the configuration by the first user.

The conversion processing has been described in specific terms hereinabove. The signal processing unit 303 is able to perform the foregoing conversion processing on the basis of various information other than the tactile control information and the characteristics of the tactile stimulation units 100B. This feature will be described hereinbelow.

The signal processing unit 303 may generate the second tactile control signal also on the basis of placement of the tactile stimulation units 100B. For example, the placement sometimes differs for the reference tactile stimulation unit and the tactile stimulation units 100B. In such cases, the signal processing unit 303 utilizes phantom sensation to generate the second tactile control signal which is inputted to the plurality of tactile stimulation units 100B so that the perceived position is the same as or substantially the same as the tactile stimulation indicated by the tactile control information. To this end, for example, the signal processing unit 303 inversely converts, on the basis of the characteristics of the reference tactile stimulation unit, the first tactile control signal included in the tactile control information to a perceived effect configured by the first user. Further, the signal processing unit 303 the signal processing unit 303 performs the same operation as the perceived position/intensity determination unit 201 of the information processing device 20 while considering the characteristics of the tactile stimulation units 100B. More precisely, the signal processing unit 303 determines (calculates) the vibration intensity for a plurality of tactile stimulation units 100B that correspond to a target perceived position (so that the designated perceived intensity is perceived in the designated perceived position) according to the perceived position and perceived intensity obtained as a result of an inverse conversion, and generates a second tactile control signal which is outputted to the plurality of tactile stimulation units 100B. Thus, even there is a difference in placement between the reference tactile stimulation unit and the tactile stimulation units 100B or when the types of tactile presentation devices themselves are different, the second user can be made to perceive the perceived effect as per the configuration by the first user.

The signal processing unit 303 may generate the second tactile control signal also on the basis of the transmission characteristics, to the second user, of the tactile stimulation outputted by the tactile stimulation units 100B. More precisely, the signal processing unit 303 generates the second tactile control signal by converting tactile control information on the basis of the difference between the transmission characteristics of the reference tactile stimulation unit and the transmission characteristics of the tactile stimulation units 100B. The transmission characteristics may vary depending on the contact area between the tactile stimulation units 100B and the user, the contact pressure, and the material properties of an object interposed between the tactile stimulation units 100B and the user (for example, fabric in the case of a vest-type tactile presentation device 10B), and the like. Because the difference in transmission characteristics between the reference tactile stimulation unit and the tactile stimulation units 100B is absorbed by performing conversion processing according to the transmission characteristics, the second user can be made to perceive the perceived effect as configured by the first user.

The signal processing unit 303 may generate the second tactile control signal on the basis of a residual capacity of a battery that is associated with the tactile stimulation units 100B. For example, the signal processing unit 303 generates the second tactile control signal in accordance with the tactile stimulation unit 100B with the lowest residual battery capacity among the plurality of tactile stimulation units 100B provided in the tactile presentation device 10B. More precisely, the signal processing unit 303 lowers the intensity of the tactile stimulation of the whole plurality of tactile stimulation units 100B to an extent enabling the tactile stimulation unit 100B with the lowest residual battery capacity to operate for a predetermined time period. Because excessive battery consumption is accordingly suppressed, the second user can be made to perceive the tactile stimulation stably.

Supplementary Information

The type of tactile stimulation indicated by the tactile control information and the type of tactile stimulation outputted by the tactile stimulation units 100B are typically the same but may also be different. For example, the type of tactile stimulation indicated by the tactile control information may be vibration and the tactile stimulation outputted by the tactile stimulation units 100B may be electrostimulation. In this case, the signal processing unit 303 generates the second tactile control signal for causing the second user to perceive electrostimulation that has the same or substantially the same frequency characteristics as the frequency characteristics of the vibration indicated by the tactile control information, for example. Thus, even when the tactile stimulation types which can be outputted by the reference tactile stimulation unit and the tactile stimulation units 100B are different, the second user can be made to artificially perceive the perceived effect as configured.

The signal processing unit 303 may record and reuse generation rules for generating the second tactile control signal from the tactile control information. Possible generation rules include, for example, an inverse characteristic of the difference between the frequency characteristics of the reference tactile stimulation unit and the frequency characteristics of the tactile stimulation units 100B, in the foregoing conversion processing. For example, once the foregoing conversion processing is executed, the signal processing unit 303 stores the generation rules in the storage unit 340 and utilizes the same generation rules until the tactile presentation device 10B is replaced. The processing burdn of the foregoing conversion processing can accordingly be reduced.

When a plurality of tactile presentation devices 10B are combined and used by the second user, the signal processing unit 303 may generate the second tactile control signal in accordance with this combination. In this case, the signal processing unit 303 generates the second tactile control signal so that the other tactile presentation devices 10B also operate in accordance with the lowest-performance tactile presentation device 10B for example.

A portion of the plurality of tactile stimulation units 100B provided in the tactile presentation device 10B need not operate. In other words, the signal processing unit 303 may generate the second tactile control signal for operating a portion of the plurality of tactile stimulation units 100B provided in the tactile presentation device 10B. Operation or non-operation of the tactile stimulation units 100B may be selected according to the performance and characteristics of the tactile stimulation units 100B, for example.

(4) Notification Unit 304

The notification unit 304 notifies the second user of information relating to output control of the tactile presentation device 10B. For example, when a new tactile stimulation unit 100B is attached to the tactile presentation device 10B the notification unit 304 may notify the second user of information to that effect. Furthermore, when the characteristics of the tactile stimulation units 100B have been measured by the second acquisition unit 302, the notification unit 304 may notify the second user of information indicating that the characteristics of the tactile stimulation units 100B are being measured. At the time of measurement, tactile stimulation for measurement may be outputted. In this case, as a result of being notified of such information, the user is able to distinguish between tactile stimulation which is outputted according to tactile control information and tactile stimulation which is outputted for measurement. An example of a notification screen that may be displayed on the display unit 330 at the time the characteristics of the tactile stimulation units 100B are acquired by the second acquisition unit 302 will be described with reference to FIG. 10.

FIG. 10 is a diagram illustrating an example of a notification screen pertaining to the acquisition of the characteristics of tactile stimulation units according to the present embodiment. FIG. 10 illustrates an example of a notification screen which is displayed at the time a tactile stimulation unit 100B is replaced. A notification screen 70 includes icons 701 to 703 that represent a vibration output device A, a vibration output device B, and an electrostimulation output device, respectively, which are candidates for the replaced tactile stimulation unit 100B. Because areas other than icon 701 of vibration output device A are grayed out on the notification screen 70, the fact that the vibration output device A has been newly attached to the tactile presentation device 10B is shown. A notification screen 71 is a screen that includes icons 711 to 713 that represent a vibration output device A, a vibration output device B, and an electrostimulation output device, respectively, which are candidates for the replaced tactile stimulation unit 100B, and that receives icon selection operations by the user. The user is able to select the icon corresponding to the replaced tactile stimulation unit 100B from among these icons. A notification screen 72 includes a progress bar 721 that indicates that the characteristics of the replaced tactile stimulation unit 100B are being measured and that illustrates the progress of such measurement. Note that the respective notification screens illustrated in FIG. 10 may be displayed using popups for which an optional screen is used as the background.

The same notification screens may also be displayed by means of the information processing device 20. In other words, the notification screens illustrated in FIG. 10 may also be similarly displayed using the timing at which the tactile stimulation units 100A provided in the tactile presentation device 10A are changed.

The notification unit 304 outputs information of which the second user is to be notified (the foregoing notification screen images, for example) to the output control unit 305.

(5) Output Control Unit 305

The output control unit 305 performs tactile stimulation output control on the tactile presentation device 10B on the basis of the second tactile control signal generated by the signal processing unit 303. More precisely, the output control unit 305 outputs the second tactile control signal generated by the signal processing unit 303 to the target tactile stimulation unit 100B. In addition, the output control unit 305 is also capable of performing playback control of content (video) that is played back by a display device (a display, an HMD, a projector, a PC, or a smartphone, or the like) and of performing, in response to playback of this content, output control of tactile stimulation from the tactile presentation device 10B with predetermined configured timing. Furthermore, the output control unit 305 is also capable of performing control to play back, from the speech output units 102 of the tactile presentation device 10B speech such as an impact sound that corresponds to the tactile stimulation presented. In addition, the output control unit 305 may perform control to display, on the display unit 330, the notification screens which are generated by the notification unit 304.

(Communication Unit 310)

The communication unit 310 sends and receives information to and from other devices. For example, the communication unit 310 transmits a tactile control signal for outputting tactile stimulation to each of the plurality of tactile stimulation units 100B (or the tactile presentation device 10B) according to the control by the output control unit 305. Furthermore, the communication unit 310 transmits, to a display device (not illustrated), a display control signal for displaying playback target images according to the control by the output control unit 305 and transmits a speech control signal for outputting playback target speech to each of the plurality of speech output units 102 of the tactile presentation device 10B (or to the tactile presentation device 10B).

The communication unit 310 communicably connects to other devices by means of wired/wireless local area network (LAN) or Wi-Fi (registered trademark), Bluetooth (registered trademark), short-range wireless communication, a mobile communication network (long term evolution (LTE) or 3G (third-generation mobile communication system)), or the like, for example.

(Operating Input Unit 320)

The operating input unit 320 receives an operating instruction by the user and outputs the operation content to the control unit 300. The operating input unit 320 may be a touch sensor, a pressure sensor, or a proximity sensor. Alternatively, the operating input unit 320 may be a physical configuration such as a keyboard, a mouse, a button, a switch, and a lever, or the like.

(Display Unit 330)

The display unit 330 is a display device that outputs a configuration screen, or the like, that enables configuration of a perceived effect. The display unit 330 may be a display device such as a liquid-crystal display (LCD) or an organic electroluminescence (EL) display, for example.

(Storage Unit 340)

The storage unit 340 is realized by a read only memory (ROM) that stores programs and operating parameters, and the like, which are used in the processing by the control unit 300 and a random access memory (RAM) that temporarily stores parameters which are suitably changed, and the like.

The configuration of the information processing device 30 according to the present embodiment has been described in specific terms hereinabove. Note that the configuration of the information processing device 30 is not limited to or by the example illustrated in FIG. 7. For example, the information processing device 30 may be configured by a plurality of devices.

Furthermore, the information processing device 30 is not limited to a PC like that illustrated in FIG. 1 and may be realized by a smartphone, a mobile phone terminal, a tablet terminal, or a dedicated terminal, or the like. In addition, at least a portion of the control unit 300 of the information processing device 30 may be realized by a server on a network. Further, the display unit 330 may be realized by a projector, and a notification screen or the like may be projected onto a wall, a table, or a screen, or the like. In this case, for the operating input by the user to the projection screen, a touch operation with respect to the projection screen may be detected by means of a camera provided separately.

3. Flow of Processing

An example of the flow of tactile stimulation output control processing that is executed by the information processing device 30 according to the present embodiment is described hereinbelow with reference to FIG. 11. FIG. 11 is a flowchart illustrating an example of the flow of tactile stimulation output control processing that is executed by the information processing device 30 according to the present embodiment.

As illustrated in FIG. 11, the second acquisition unit 302 first acquires information indicating the characteristics of the one or more tactile stimulation units 100B provided in the tactile presentation device 10B (step S102). Next, the first acquisition unit 301 acquires tactile control information indicating the result of the perceived effect configuration by the first user (step S104). The tactile control information includes a first tactile control signal. The tactile control information may include information in which the first tactile control signal and information indicating the characteristics of the reference tactile stimulation unit are associated.

Further, the signal processing unit 303 generates a second tactile control signal for causing the second user to perceive the tactile stimulation indicated by the tactile control information on the basis of the acquired information indicating the characteristics of the tactile stimulation units 100B and tactile control information (step S106). More precisely, the signal processing unit 303 generates the second tactile control signal by converting the first tactile control signal included in the tactile control information on the basis of the difference between the characteristics of the reference tactile stimulation unit and the characteristics of the tactile stimulation units 100B.

Thereafter, the output control unit 305 presents tactile stimulation to the tactile presentation device 10B on the basis of the second tactile control signal (step S108). More precisely, the output control unit 305 outputs tactile stimulation using the tactile stimulation units 100B by outputting the second tactile control signal to the tactile stimulation units 100B.

An example of the flow of tactile stimulation output control processing has been described hereinabove. By means of the processing described hereinabove, the second user configured by the first user can be made to perceive the tactile stimulation which is to be perceived by the second user as configured.

4. Summary

One embodiment of the present disclosure has been described in detail hereinabove with reference to FIGS. 1 to 11. As described hereinabove, the information processing device 30 according to the present embodiment acquires tactile control information relating to the tactile stimulation which is to be perceived by the second user configured by the first user and information indicating the characteristics of the tactile stimulation units 100B which output the tactile stimulation to the second user. Further, the information processing device 30 generates a second tactile control signal which is inputted to the tactile stimulation units 100B and serves to cause the second user to perceive the tactile stimulation indicated by the tactile control information on the basis of the tactile control information and the characteristics of the tactile stimulation units 1008. Thus, because the differences in the characteristics of each of the tactile presentation devices 10, which are used when providing tactile stimulation to the user, are absorbed, the second user is then able to perceive the perceived effect as configured by the first user. Deterioration in the user experience is thus suppressed.

Preferred embodiments of the present disclosure have been described in detail hereinabove with reference to the accompanying drawings, but the technical scope of the present disclosure is not limited to or by such examples. It is clear that a person ordinarily skilled in the technological field of the present disclosure would be able to arrive at various modification examples or revision examples within the scope of the technological ideas described in the claims, and such examples are also automatically recognized as belonging to the technological scope of the present disclosure.

For example, although tactile control information is described as including a first tactile control signal in the foregoing embodiments, the present technology is not limited to or by this example. For example, the tactile control information may include, instead of the first tactile control signal, information indicating the perceived effect configured by the first user. In this case, the signal processing unit 303 of the information processing device 30 performs the same operation as the perceived position/intensity determination unit 201 of the information processing device 20 while considering the characteristics of the tactile stimulation units 100B. More precisely, the signal processing unit 303 determines (calculates) the vibration intensity for a plurality of tactile stimulation units 100B that correspond to a target perceived position (so that the designated perceived intensity is perceived in the designated perceived position) according to the perceived position and perceived intensity which have been designated by the first user, and generates a second tactile control signal which is outputted to the plurality of tactile stimulation units 100B.

In addition, although the tactile presentation devices 10A and 10B and the information processing devices 20 and 30 are standalone devices in the foregoing embodiments, the present technology is not limited to or by this example. For example, the tactile presentation device 10A and the information processing device 20 may be configured to be integral with each other, the tactile presentation device 10B and the information processing device 30 may be configured to be integral with each other, and the information processing device 20 and the information processing device 30 may be configured to be integral with each other.

Furthermore, although the tactile presentation devices 10A and 10B and the first user and second user are each described as being separate in the foregoing embodiments, the present technology is not limited to or by this example. For example, the first user and second user may be the same person or the tactile presentation device 10A and tactile presentation device 10B may be the same tactile presentation device 10. In this case, the user wears the tactile presentation device 10, configures the perceived effect, and feels the perceived effect thus configured in real time. At such time, a tactile control signal with which the characteristics of the tactile stimulation units 100 are absorbed is generated on the basis of the characteristics of the tactile stimulation units 100 of the tactile presentation device 10 worn by the user and is inputted to the tactile stimulation units 100 of the tactile presentation device 10. Thus, the user is able to configure the perceived effect irrespective of the characteristics of the tactile presentation device 10. Furthermore, the user is also able to repeatedly adjust the perceived effect while replacing the tactile stimulation units 100 of the tactile presentation device 10. Thus, the user is able to easily design the perceived effect for various tactile presentation devices 10.

In addition, it is also possible to create a computer program for causing a processor (for example, a CPU or DSP, or the like), which is provided in the device of the present specification (for example, the tactile presentation device 10, information processing device 20, or information processing device 30), to function as the constituent elements of the foregoing device (for example, the control unit 110, the control unit 200, and/or the control unit 300) (that is, a computer program for causing the processor to execute the operations of the constituent elements of the foregoing device). Furthermore, a recording medium whereon the computer program is recorded may also be provided. Further, a device that includes a memory that stores the foregoing computer program and one or more processors capable of executing the computer program (for example, a module for the tactile presentation device 10, a module for the information processing device 20, or a module for the information processing device 30) may also be provided. In addition, a method that includes the operations of the constituent elements of the foregoing device (for example, the control unit 110, the control unit 200, and/or the control unit 300, or the like) is also included in the technology pertaining to the present disclosure.

Furthermore, the processing described in the present specification by using the flowchart and sequence diagrams need not necessarily be executed in the illustrated order. Several processing steps may also be executed in parallel. Moreover, additional processing steps may be adopted or some of processing steps may be omitted.

Moreover, the effects described in the present specification are merely illustrative or exemplary and are not restrictive. In other words, the technology pertaining to the present disclosure may, in addition to the foregoing advantageous effects or instead of the foregoing advantageous effects, afford other advantageous effects which would be obvious to a person skilled in the art from the description of the present specification.

Note that the following configurations also fall within the technical scope of the present disclosure.

(1)

An information processing device, comprising:
    a control unit that generates, on the basis of control information relating to tactile stimulation to be perceived by a second user as configured by a first user and on the basis of characteristics of a tactile stimulation unit that outputs the tactile stimulation to the second user, a control signal which is inputted to the tactile stimulation unit and which serves to cause the second user to perceive the tactile stimulation indicated by the control information.

(2)

The information processing device according to (1), wherein the control unit generates the control signal by converting the control information on the basis of a difference between the characteristics of a reference tactile stimulation unit and the characteristics of the tactile stimulation unit.

(3)

The information processing device according to (2), wherein the control information includes information that associates a control signal for the reference tactile stimulation unit with information indicating the characteristics of the reference tactile stimulation unit.

(4)

The information processing device according to (2) or (3), wherein the control unit generates the control signal for causing the second user to perceive tactile stimulation the intensity of which is the same as or substantially the same as the tactile stimulation indicated by the control information.

(5)

The information processing device according to (4),
    wherein the tactile stimulation outputted by the tactile stimulation unit is vibration, and
    wherein the control unit generates the control signal by applying an inverse characteristic of the difference between a frequency characteristic of the reference tactile stimulation unit and a frequency characteristic of the tactile stimulation unit to the control signal that is included in the control information.

(6)

The information processing device according to (4),
    wherein the tactile stimulation outputted by the tactile stimulation unit is temperature, and
    wherein the control unit generates the control signal by applying an inverse characteristic of the difference between a temperature variation characteristic of the reference tactile stimulation unit and a temperature variation characteristic of the tactile stimulation unit to the control signal that is included in the control information.

(7)

The information processing device according to any one of (2) to (6), wherein the control unit generates the control signal for causing the second user to perceive tactile stimulation for which the difference between a maximum value and a minimum value of the intensity is the same as or substantially the same as the tactile stimulation indicated by the control information.

(8)

The information processing device according to any one of (2) to (7), wherein the control unit generates the control signal for causing the second user to perceive tactile stimulation with the same or substantially the same timing as the tactile stimulation indicated by the control information.

(9)

The information processing device according to any one of (2) to (8), wherein the control unit generates the control signal for causing the second user to perceive tactile stimulation the perceived position of which is the same as or substantially the same as the tactile stimulation indicated by the control information.

(10)

The information processing device according to any one of (1) to (9), wherein the control unit generates the control signal also on the basis of placement of the tactile stimulation unit.

(11)

The information processing device according to any one of (1) to (10), wherein the control unit generates the control signal also on the basis of a transmission characteristic, to the second user, of the tactile stimulation outputted by the tactile stimulation unit.

(12)

The information processing device according to any one of (1) to (11), wherein the control unit generates the control signal on the basis of a residual capacity of a battery that is associated with the tactile stimulation unit.

(13)

The information processing device according to any one of (1) to (12), wherein the control unit measures the characteristics of the tactile stimulation unit while causing the tactile stimulation unit to operate.

(14)

The information processing device according to (13), wherein the control unit notifies the second user of information indicating that the characteristics of the tactile stimulation unit are being measured.

(15)

The information processing device according to any one of (1) to (14), wherein the type of tactile stimulation indicated by the control information and the type of tactile stimulation outputted by the tactile stimulation unit are different.

(16)

The information processing device according to any one of (1) to (15), wherein the control unit records and reuses generation rules for generating the control signal from the control information.

(17)

An information processing method that is executed by a processor, the method comprising:
generating, on the basis of control information relating to tactile stimulation to be perceived by a second user as configured by a first user and on the basis of characteristics of a tactile stimulation unit that outputs the tactile stimulation to the second user, a control signal which is inputted to the tactile stimulation unit and which serves to cause the second user to perceive the tactile stimulation indicated by the control information.

(18)

A recording medium whereon a program is recorded, the program serving to cause a computer to function as
a control unit that generates, on the basis of control information relating to tactile stimulation to be perceived by a second user as configured by a first user and on the basis of characteristics of a tactile stimulation unit that outputs the tactile stimulation to the second user, a control signal which is inputted to the tactile stimulation unit and which serves to cause the second user to perceive the tactile stimulation indicated by the control information.

REFERENCE SIGNS LIST

10 TACTILE PRESENTATION DEVICE
100 TACTILE STIMULATION UNIT
102 SPEECH OUTPUT UNIT
110 CONTROL UNIT
120 COMMUNICATION UNIT
130 SENSOR UNIT
20 INFORMATION PROCESSING DEVICE
200 CONTROL UNIT
201 PERCEIVED POSITION/INTENSITY DETERMINATION UNIT
202 SCREEN GENERATION UNIT
203 OUTPUT CONTROL UNIT
210 COMMUNICATION UNIT
220 OPERATING INPUT UNIT
230 DISPLAY UNIT
240 STORAGE UNIT
30 INFORMATION PROCESSING DEVICE
300 CONTROL UNIT
301 FIRST ACQUISITION UNIT
302 SECOND ACQUISITION UNIT
303 SIGNAL PROCESSING UNIT
304 NOTIFICATION UNIT
305 OUTPUT CONTROL UNIT
310 COMMUNICATION UNIT
320 OPERATING INPUT UNIT
330 DISPLAY UNIT
340 STORAGE UNIT

The invention claimed is:

1. An information processing device, comprising:
a control unit configured to generate, based on control information related to a tactile stimulation to be perceived by a user and characteristics of a tactile stimulation unit that outputs the tactile stimulation to the user, a control signal which is inputted to the tactile stimulation unit, wherein
the tactile stimulation unit outputs the tactile stimulation to the user based on the generated control signal,
the tactile stimulation unit serves to cause the user to perceive the tactile stimulation outputted by the tactile stimulation unit,
the control signal is generated by conversion of the control information, and
the conversion of the control information is based on a difference between characteristics of a reference tactile stimulation unit and the characteristics of the tactile stimulation unit.

2. The information processing device according to claim 1, wherein the control information includes information that associates a reference control signal for the reference tactile stimulation unit with information indicating the characteristics of the reference tactile stimulation unit.

3. The information processing device according to claim 1, wherein the control unit is further configured to generate the control signal for the user to perceive the tactile stimulation outputted by the tactile stimulation unit with an intensity same as an intensity of the tactile stimulation indicated by the control information.

4. The information processing device according to claim 3, wherein
the tactile stimulation outputted by the tactile stimulation unit is vibration, and
the control unit is further configured to generate the control signal by application of an inverse characteristic, of a difference between a frequency characteristic of the reference tactile stimulation unit and a frequency characteristic of the tactile stimulation unit, to a reference control signal included in the control information.

5. The information processing device according to claim 3, wherein
the tactile stimulation outputted by the tactile stimulation unit is temperature, and
the control unit is further configured to generate the control signal by application of an inverse characteristic, of a difference between a temperature variation characteristic of the reference tactile stimulation unit and a temperature variation characteristic of the tactile stimulation unit, to a reference control signal that is included in the control information.

6. The information processing device according to claim 1, wherein the control unit is further configured to generate the control signal that causes the user to perceive the tactile stimulation for which a difference between a maximum value and a minimum value of an intensity of the tactile stimulation outputted by the tactile stimulation unit is same as a difference between a maximum value and a minimum value of an intensity of the tactile stimulation indicated by the control information.

7. The information processing device according to claim 1, wherein the control unit is further configured to generate the control signal that causes the user to perceive the tactile stimulation outputted by the tactile stimulation unit with same timing characteristic as time characteristic of the tactile stimulation indicated by the control information.

8. The information processing device according to claim 1, wherein the control unit is further configured to generate the control signal that causes the user to perceive the tactile stimulation, outputted by the tactile stimulation unit, at a perceived position which is same as a perceived position associated with the tactile stimulation indicated by the control information.

9. The information processing device according to claim 1, wherein the control unit is further configured to generate the control signal based on a placement of the tactile stimulation unit.

10. The information processing device according to claim 1, wherein the control unit is further configured to generate the control signal based on a transmission characteristic of the tactile stimulation unit.

11. The information processing device according to claim 1, wherein the control unit is further configured to generate the control signal based on a residual capacity of a battery that is associated with the tactile stimulation unit.

12. The information processing device according to claim 1, wherein the control unit is further configured to measure the characteristics of the tactile stimulation unit in a case where the tactile stimulation unit is in operation.

13. The information processing device according to claim 12, wherein the control unit is further configured to notify the user of information that indicates measurement of the characteristics of the tactile stimulation unit.

14. The information processing device according to claim 1, wherein a type of the tactile stimulation indicated by the control information is different from a type of the tactile stimulation outputted by the tactile stimulation unit.

15. The information processing device according to claim 1, wherein the control unit is further configured to record and reuse generation rules for generation of the control signal from the control information.

16. The information processing device according to claim 1, wherein the characteristics of the tactile stimulation unit comprises at least one of transmission characteristics, output characteristics, placement information, or battery information.

17. The information processing device according to claim 16, wherein the transmission characteristics include a plurality of coefficients to transmit at least one of vibration, temperature, or electrostimulation outputted by the tactile stimulation unit.

18. An information processing method, comprising:
generating, based on control information related to a tactile stimulation to be perceived by a user and characteristics of a tactile stimulation unit that outputs the tactile stimulation to the user, a control signal which is inputted to the tactile stimulation unit, wherein
the tactile stimulation unit outputs the tactile stimulation to the user based on the generated control signal,
the tactile stimulation unit serves to cause the user to perceive the tactile stimulation outputted by the tactile stimulation unit,
the control signal is generated by conversion of the control information, and
the conversion of the control information is based on a difference between characteristics of a reference tactile stimulation unit and the characteristics of the tactile stimulation unit.

19. A non-transitory computer-readable medium having stored thereon, computer-executable instructions which, when executed by a computer, cause the computer to execute operations, the operations comprising:
generating, based on control information related to a tactile stimulation to be perceived by a user and characteristics of a tactile stimulation unit that outputs the tactile stimulation to the user, a control signal which is inputted to the tactile stimulation unit, wherein
the tactile stimulation unit outputs the tactile stimulation to the user based on the generated control signal,
the tactile stimulation unit serves to cause the user to perceive the tactile stimulation outputted by the tactile stimulation unit,
the control signal is generated by conversion of the control information, and
the conversion of the control information is based on a difference between characteristics of a reference tactile stimulation unit and the characteristics of the tactile stimulation unit.

* * * * *